United States Patent [19]

Schaumburg et al.

[11] Patent Number: 4,534,401
[45] Date of Patent: Aug. 13, 1985

[54] APPARATUS AND METHOD FOR CASTING STRAPS ON BATTERY CELL ELEMENTS

[75] Inventors: Edward G. Schaumburg, Askov; Cory D. Benson, Bloomington; Alby H. Wolf, Minneapolis; Michael G. Zais, Richfield, all of Minn.

[73] Assignee: GNB Batteries Inc., Mendota Heights, Minn.

[21] Appl. No.: 380,785

[22] Filed: May 21, 1982

[51] Int. Cl.³ .............................................. B22D 19/00
[52] U.S. Cl. ..................................... 164/102; 164/103; 164/109; 164/112; 164/130; 164/326; 164/334; 164/338.1; 164/DIG. 1
[58] Field of Search ................. 164/DIG. 1, 129, 130, 164/325, 326, 329, 332, 334, 338.1, 102, 103, 108, 109, 111, 112

[56] References Cited

U.S. PATENT DOCUMENTS

| | | | |
|---|---|---|---|
| 2,978,762 | 4/1961 | McAlpine | 164/DIG. 1 |
| 3,444,920 | 5/1969 | McAlpine | 164/108 |
| 3,504,731 | 4/1970 | Farmer | 164/DIG. 1 X |
| 3,547,183 | 10/1970 | Clingenpeel | 164/333 |
| 3,704,746 | 12/1972 | Thompson et al. | 164/326 X |
| 3,802,488 | 4/1974 | Hull et al. | 164/270 |
| 3,988,169 | 10/1976 | McLean | 29/623.1 |
| 4,144,927 | 3/1979 | Emerton et al. | 164/108 |
| 4,180,120 | 10/1979 | Eberle | 164/109 |
| 4,241,780 | 10/1980 | Eberle | 164/333 |
| 4,349,959 | 9/1982 | Urban | 164/DIG. 1 X |
| 4,351,106 | 9/1982 | Brady | 29/730 |

Primary Examiner—Nicholas P. Godici
Assistant Examiner—Richard K. Seidel
Attorney, Agent, or Firm—Augustus J. Hipp; Dennis R. Schlemmer

[57] ABSTRACT

A method and apparatus for casting straps onto the plate lugs of battery cell elements. The apparatus includes a rotatably indexable table having a plurality of mold and element carrying stations which each are successively indexed through a plurality of operating stations, including an element loading station, an element lug alignment station, a molten-metal pouring station, a lug fluxing station, a casting station, a plurality of mold cooling stations, and an element unloading station. The mold of each table station is adapted for efficient and precisely controlled electrical resistance heating and forced-air cooling during each cycle of operation. In the illustrated embodiment, each table-station mold is successively heated from electrical sources at a plurality of operating stations upon indexing of the respective table station to such operating stations and is cooled by directing air through air-direction tubes mounted on each table station in close proximity to the respective mold. The apparatus includes a master controller that controls operation of the plurality of table and operating stations and maintains optimum casting conditions in each mold and the molten metal dispensed therein at the time of casting.

63 Claims, 49 Drawing Figures

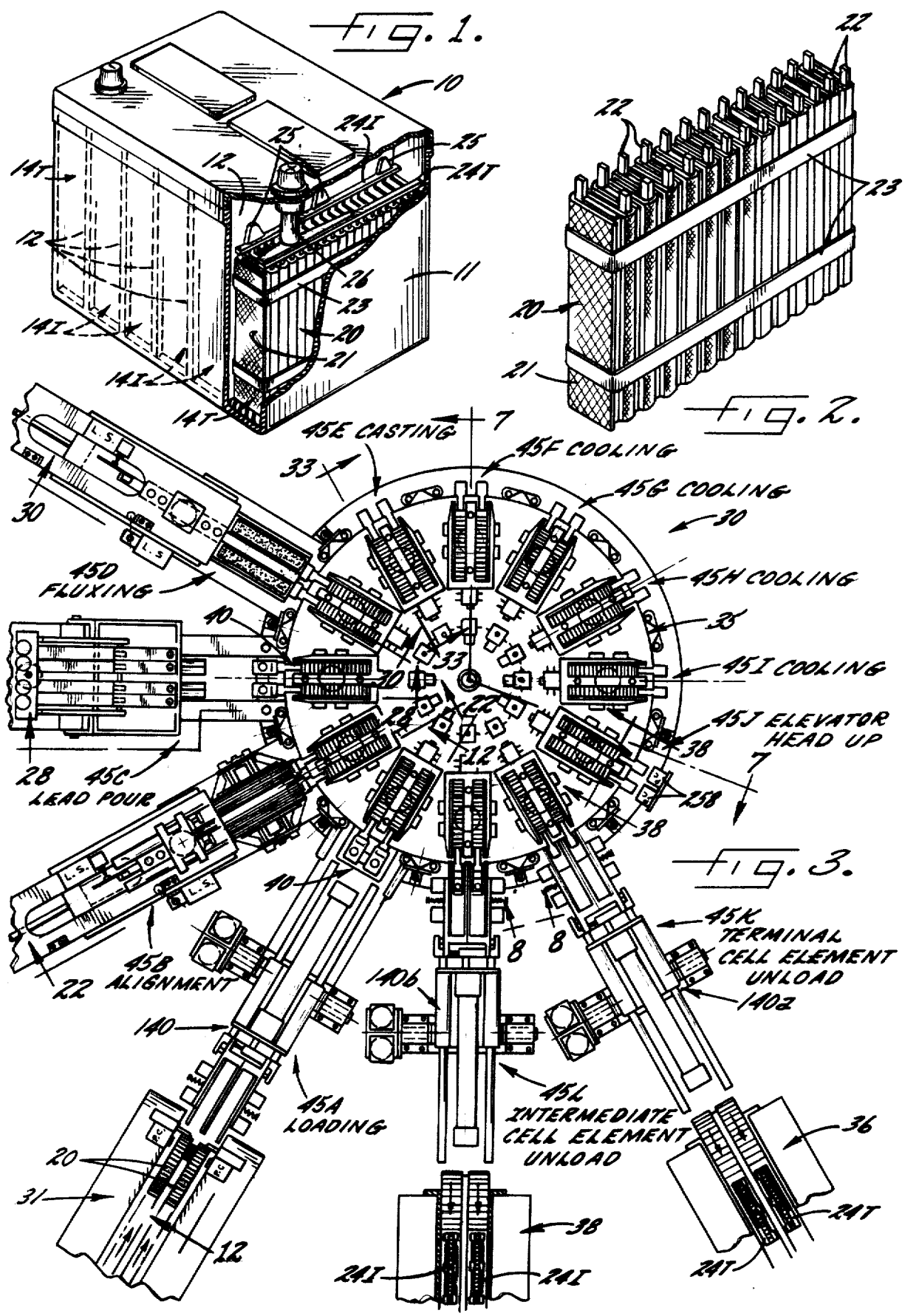

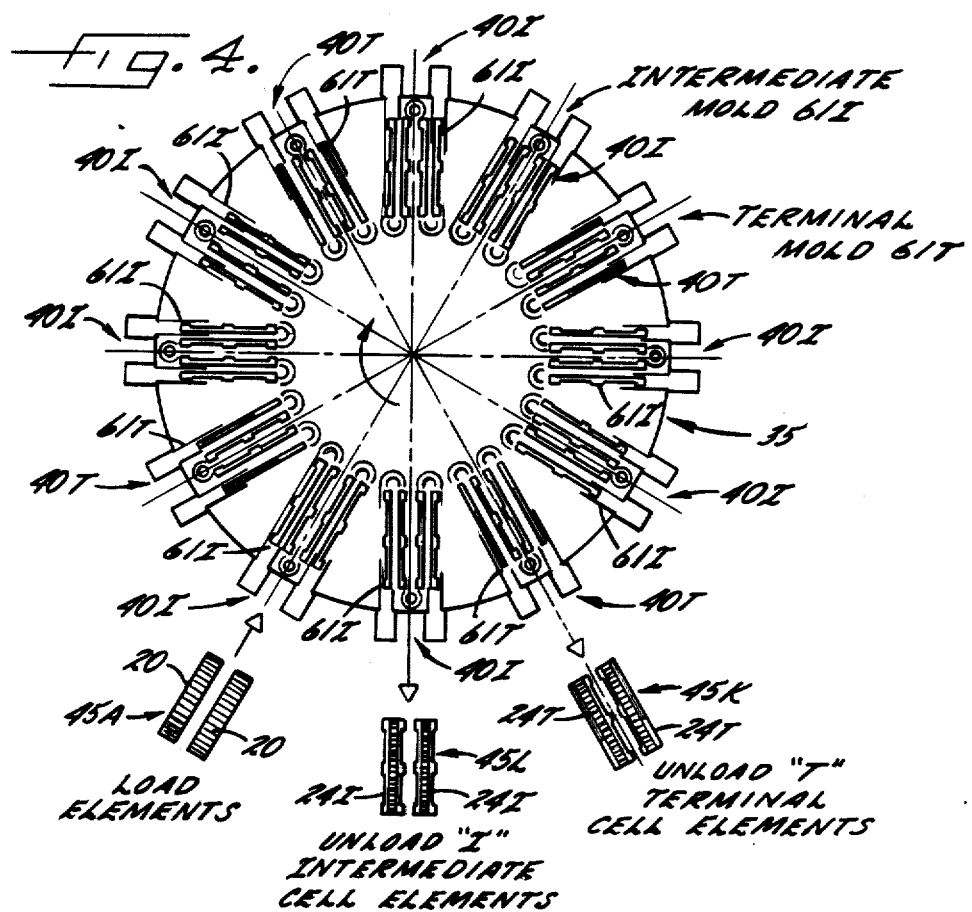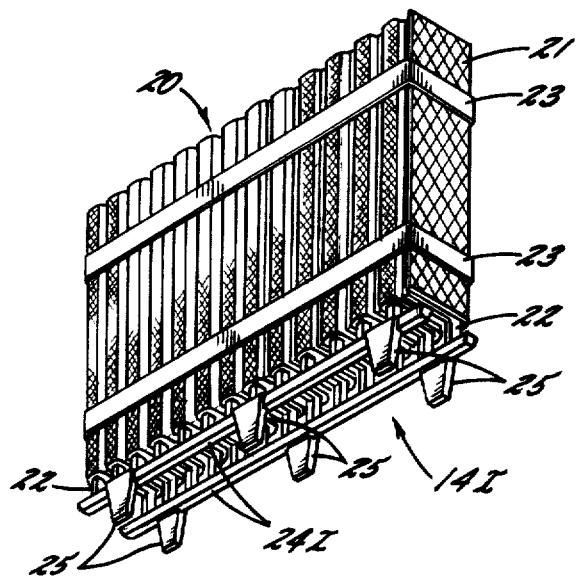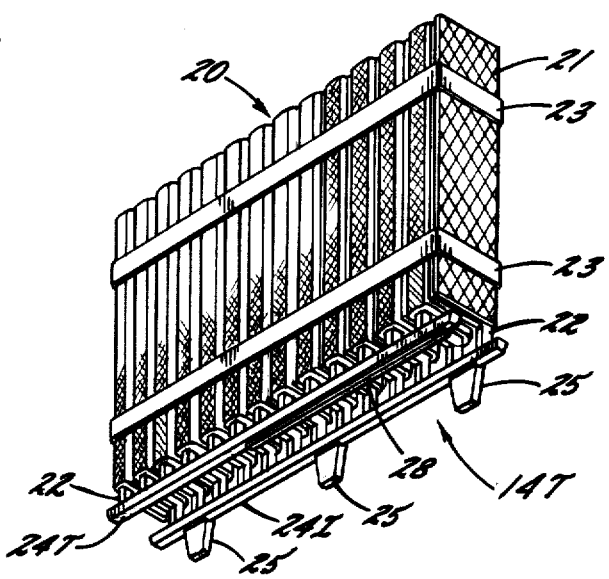

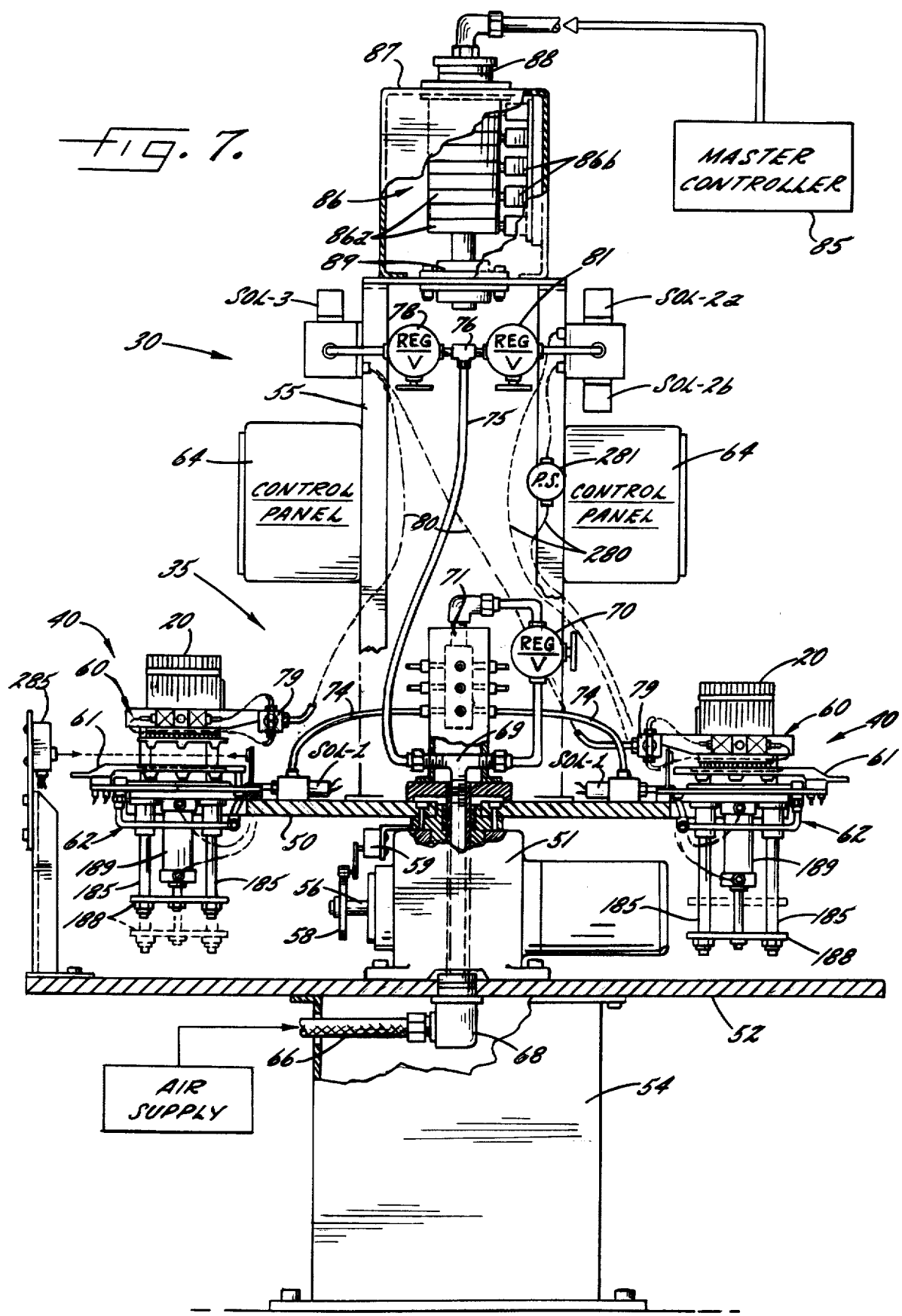

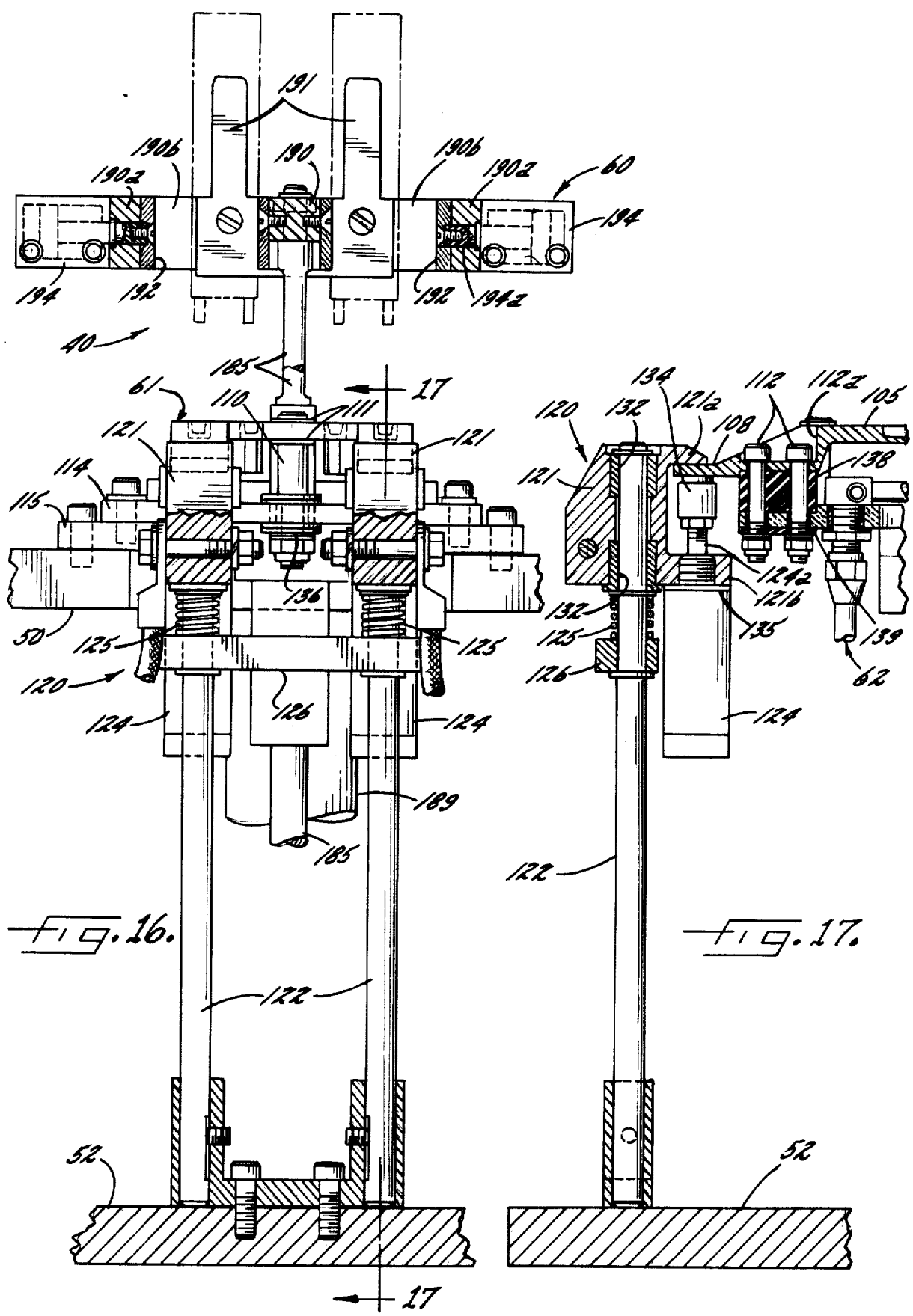

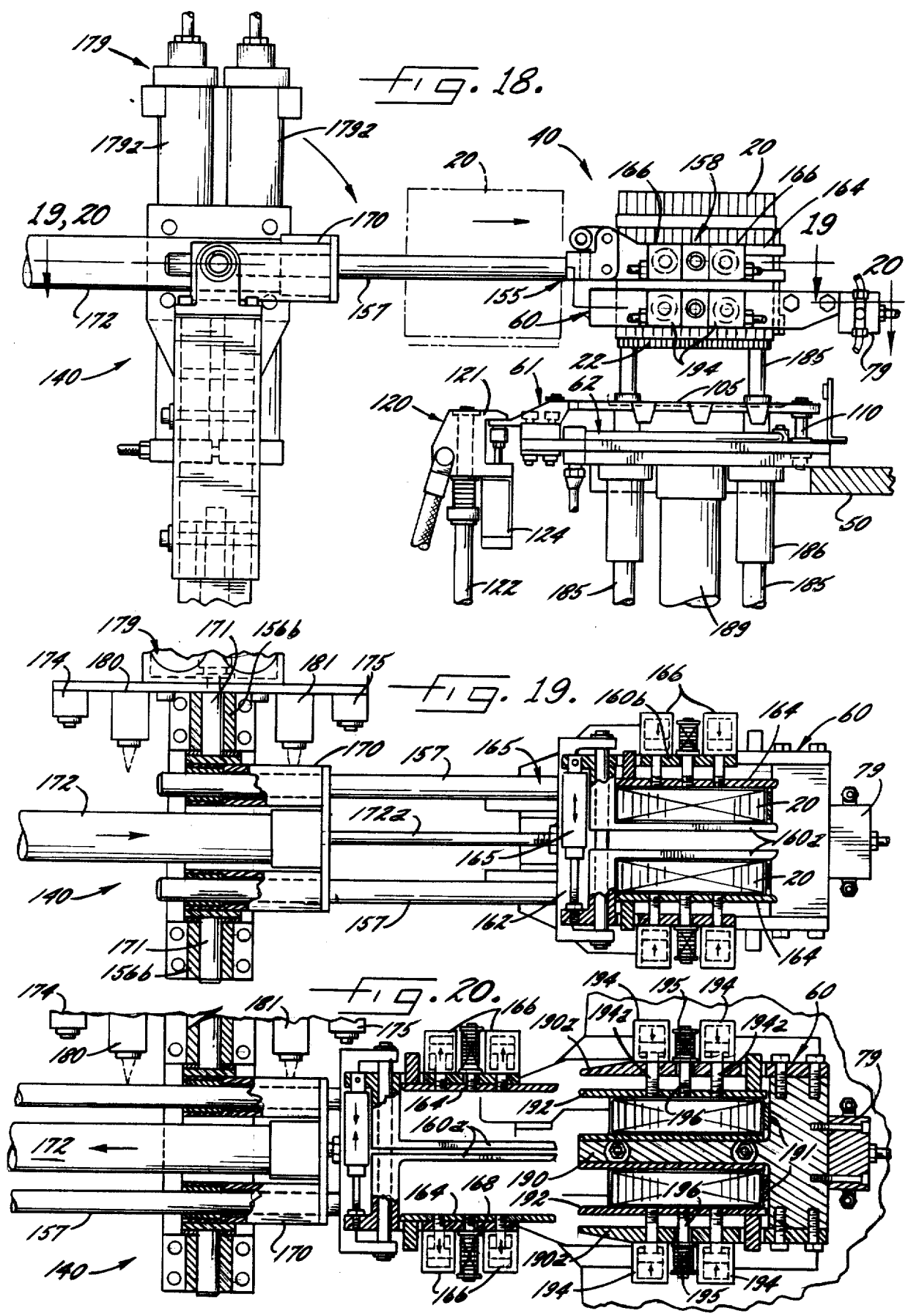

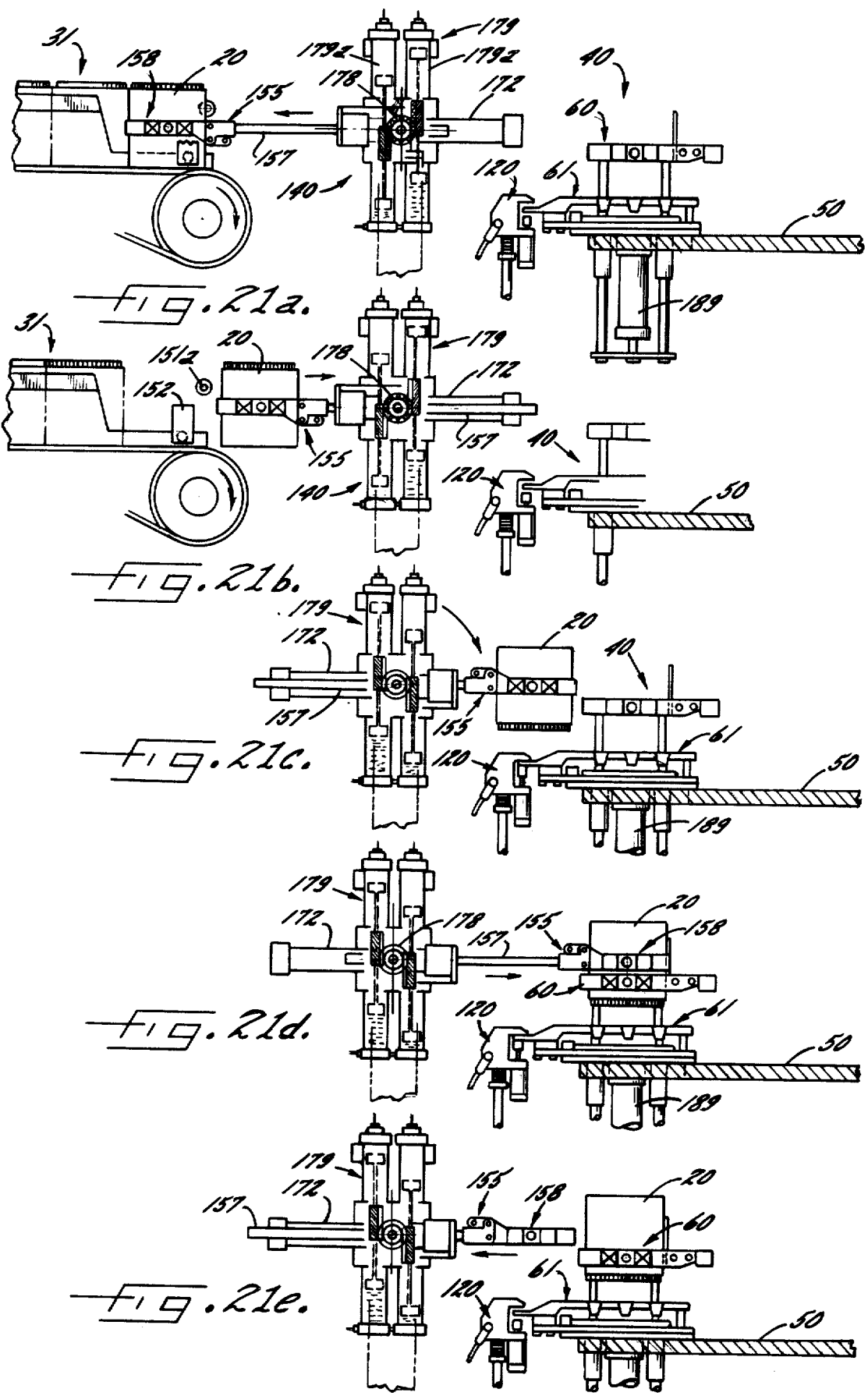

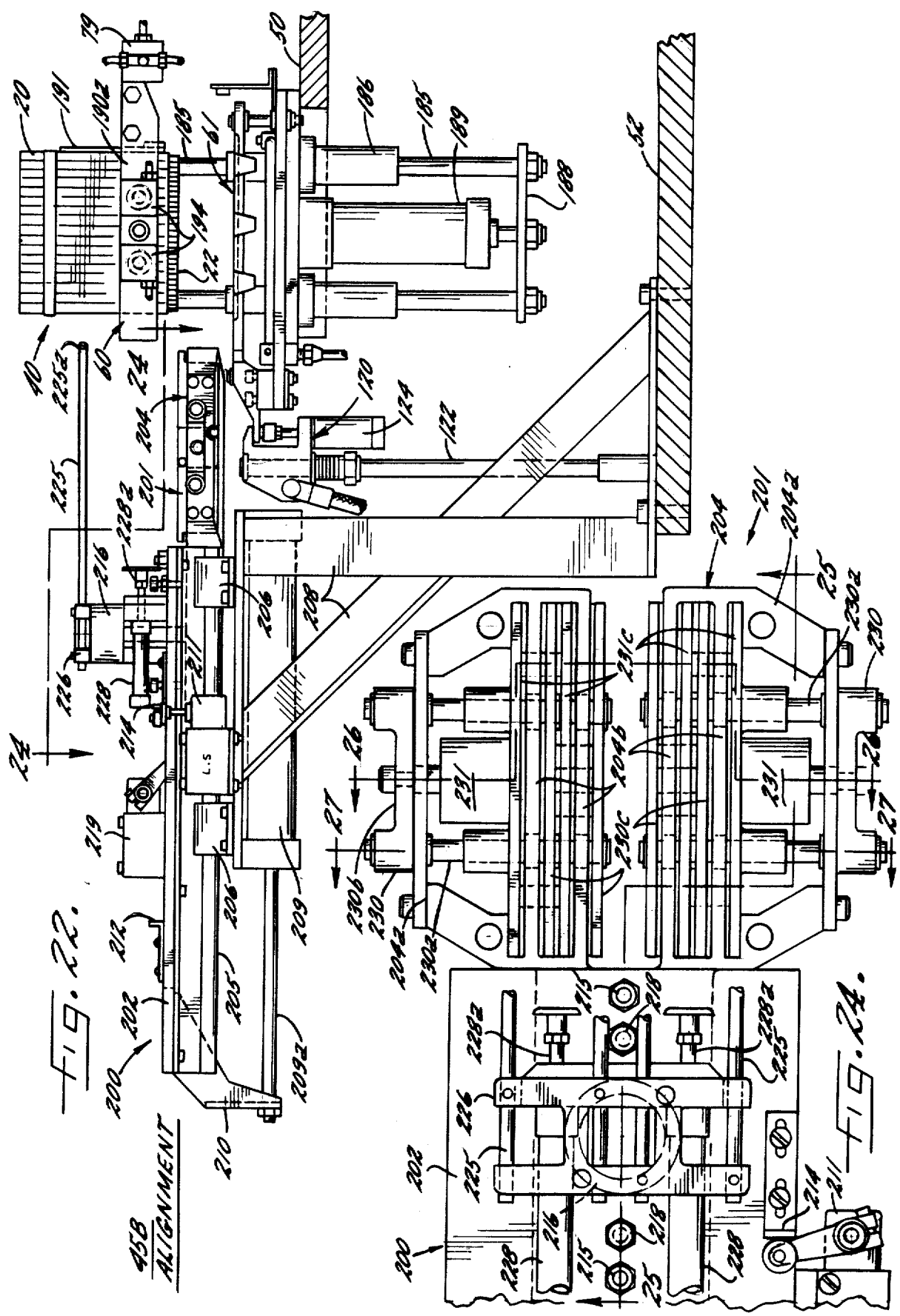

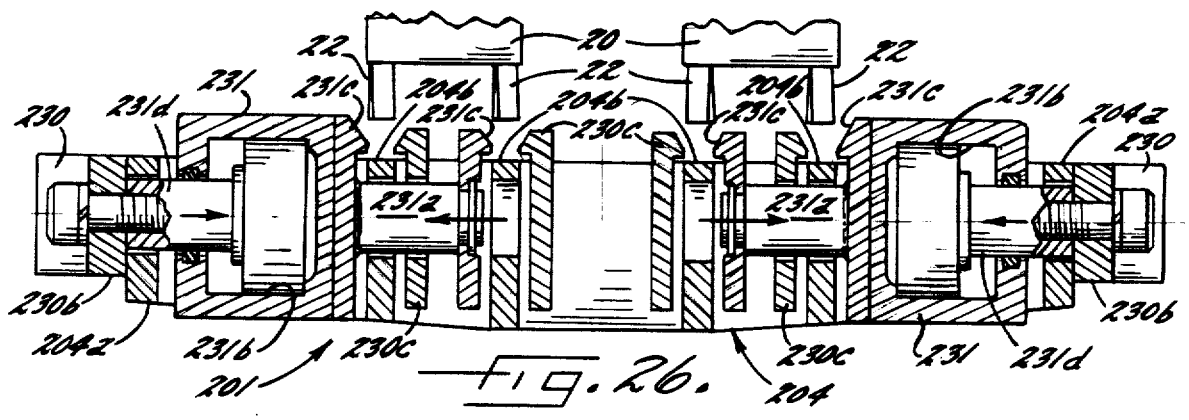
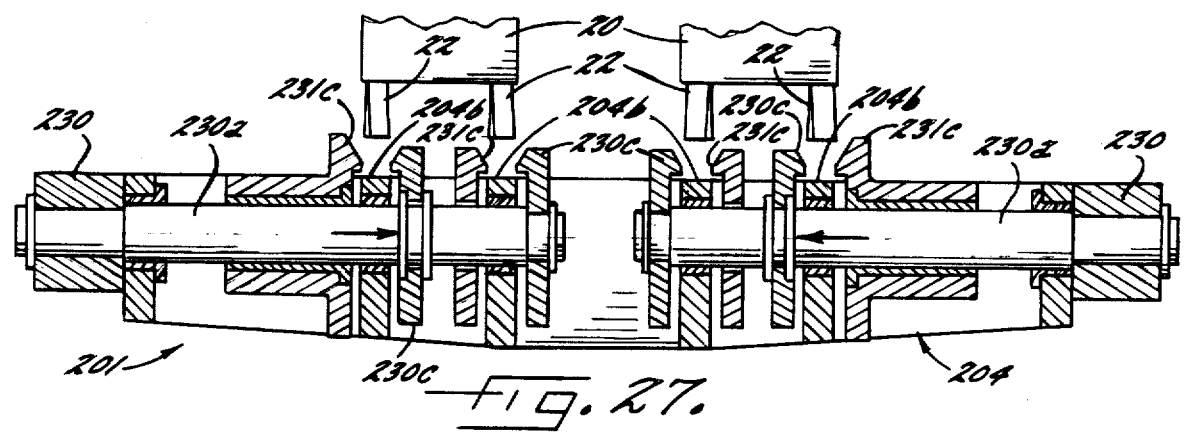
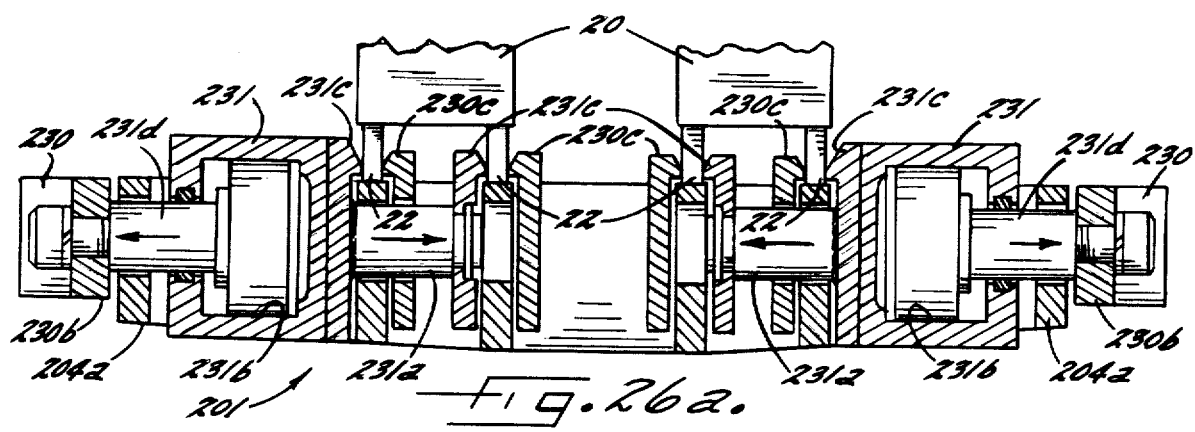
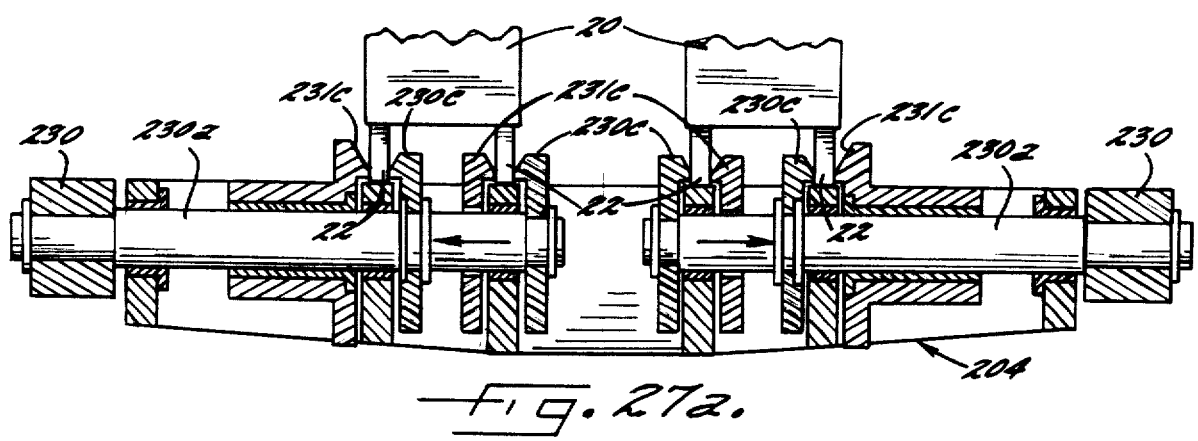

45C LEAD POUR

450 FLUXING

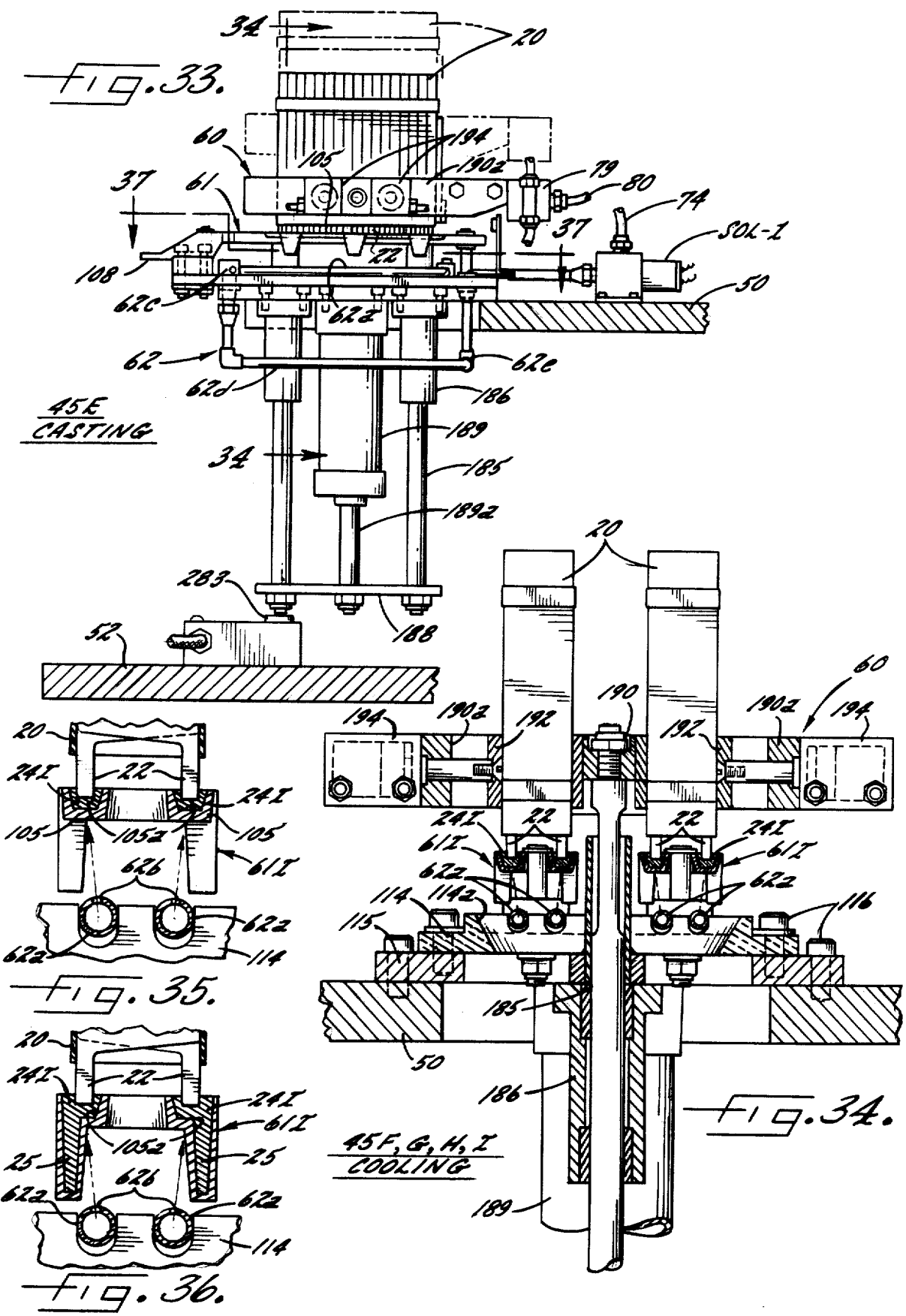

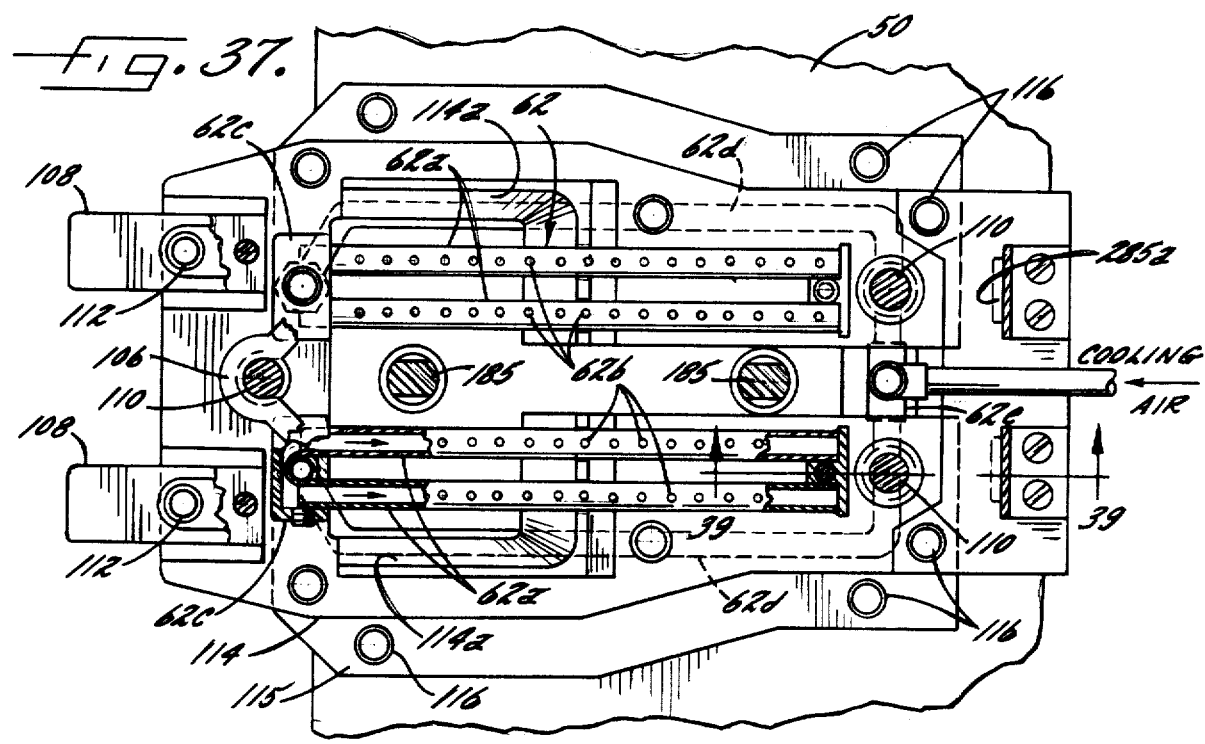
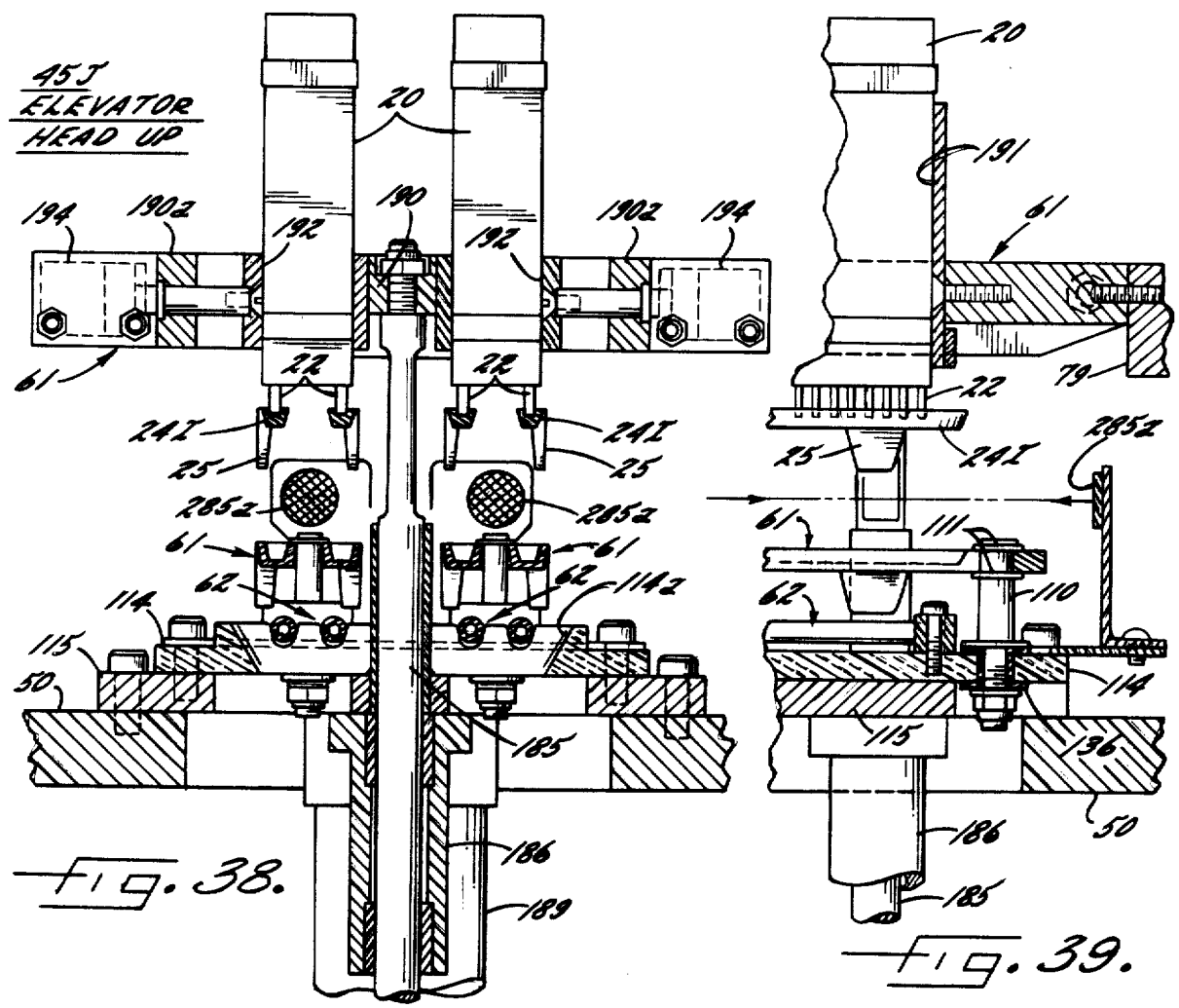

APPARATUS AND METHOD FOR CASTING STRAPS ON BATTERY CELL ELEMENTS

RELATED APPLICATIONS

Klang and Rao, U.S. Ser. No. 352,924, filed Feb. 26, 1982, for: Lead-Acid Battery and Method of Making Same; a continuation-in-part of U.S. Ser. No. 245,772, filed Mar. 20, 1981. Wolf and Oswald, U.S. Ser. No. 380,826, filed May 21, 1982, for: Electrically Heatable Mold and Method of Casting Metal Straps.

DESCRIPTION OF THE INVENTION

The present invention relates generally to lead-acid storage batteries, and more particularly, to a method and apparatus for casting straps onto the plate lugs of battery cell elements.

Heretofore, it has been the practice to assemble battery cell elements comprising a plurality of lead grids coated or filled with suitable paste and grouped as alternative positive and negative plates separated by interleaved electrical insulating separators and then to secure and electrically couple the assembly of plates by casting lead straps onto respective groups of lugs for the positive and negative plates. While different approaches have been proposed for casting such lug straps, they have suffered from various drawbacks, including inefficient and slow operation and difficulties in controlling casting conditions.

Problems have been incurred, for example, in controlling the temperature of the mold and molten lead for optimum and efficient casting. In processes where hot molten lead is introduced into an unpreheated, relatively cool mold, although cooling of the molten lead is expedited, the timing in which the element lugs must be placed into the rapidly cooling molten lead is critical, and a delay of only a fraction of a second can affect the quality of the casting. To minimize such timing problems, others have proposed preheating the mold to substantially the temperature of the molten lead by passing heated fluids through passageways in the mold, or by incorporating electrical heating elements in the mold. Such approaches, however, increase the mass of the mold, which in turn makes heating and cooling of the mold inherently slower, less efficient, and more difficult to precisely control. When efforts have been made to externally preheat the mold, such as by a gas flame or torch, the gas flow creates significant noise problems and heating is grossly inefficient.

Further problems have been incurred in handling and transferring the relatively loosely composed arrangement of plates which comprise the cell element prior to casting of the lug straps. Because the elements customarily are placed in the mold in an inverted position with the lugs depending from the underside thereof, it has been cumbersome to handle and transfer the elements in such condition, either to the casting machine, or between operating stations of the machine. Moreover, it usually has been necessary to precisely align the lugs of the element prior to transfer to the casting machine. This often has necessitated a separate machine, or manual effort, and steps have had to be taken for maintaining such alignment during transfer to the mold.

Furthermore, since the straps that are cast onto elements intended for use in terminal cells of a battery must be provided with a terminal post, unnecessary for cells located intermediate the terminal battery cells, difficulties have arisen in coordinating the casting of different strap forms for such terminal and intermediate cell elements.

It is an object of the present invention to provide a method and apparatus for more efficiently casting lug straps onto lead acid battery cell elements.

Another object is to provide such a method and apparatus which ensures optimum casting conditions in the mold and molten lead at the time of casting. A related object is to provide a method and apparatus of the foregoing type which permits relatively precise control of the temperature of the mold and molten lead on a continuous basis, and which eliminates the necessity for critical timing in the casting operation following mold filling.

A further object is to provide a method and apparatus as characterized above that permits easy handling of the battery cell elements and which allows the elements to be delivered to and from the casting machine in their usual upright position with the lugs thereof on the top side.

Yet another object is to provide an apparatus for casting straps on battery cell elements that is adapted to receive the elements without prior precise alignment of the lugs thereof.

Still a further object is to provide a method and apparatus of the above kind that is adapted to cast one form of lug strap on cell elements intended for use in intermediate cells of a lead acid battery and while successively and continuously casting a different form of lug strap on cell elements intended for use in terminal cells of the battery.

Other objects and advantages of the invention will become apparent upon reading the following detailed description and upon reference to the drawings, in which:

FIG. 1 is a perspective of a lead acid storage battery having cell elements with cast-on straps of the type formed by the method and apparatus of the present invention;

FIG. 2 is an enlarged perspective of one of the cell elements used in the battery illustrated in FIG. 1, prior to the casting of straps on the lugs thereof;

FIG. 3 is a partially diagrammatic top plan view of an illustrative apparatus embodying the present invention;

FIG. 4 is a diagrammatic top plan view of the multiple station mold and cell element carrying carousel included in the apparatus shown in FIG. 3, showing a single element loading station and separate unloading stations for elements with cast-on straps for use in terminal and intermediate battery cells;

FIG. 5 is an enlarged perspective of an intermediate battery cell with straps cast thereon by the illustrated apparatus;

FIG. 6 is an enlarged perspective of a terminal battery cell with straps cast thereon by the illustrated apparatus;

FIG. 7 is an enlarged vertical section of the illustrated machine taken in the plane of 7—7 in FIG. 3;

Figure 8:
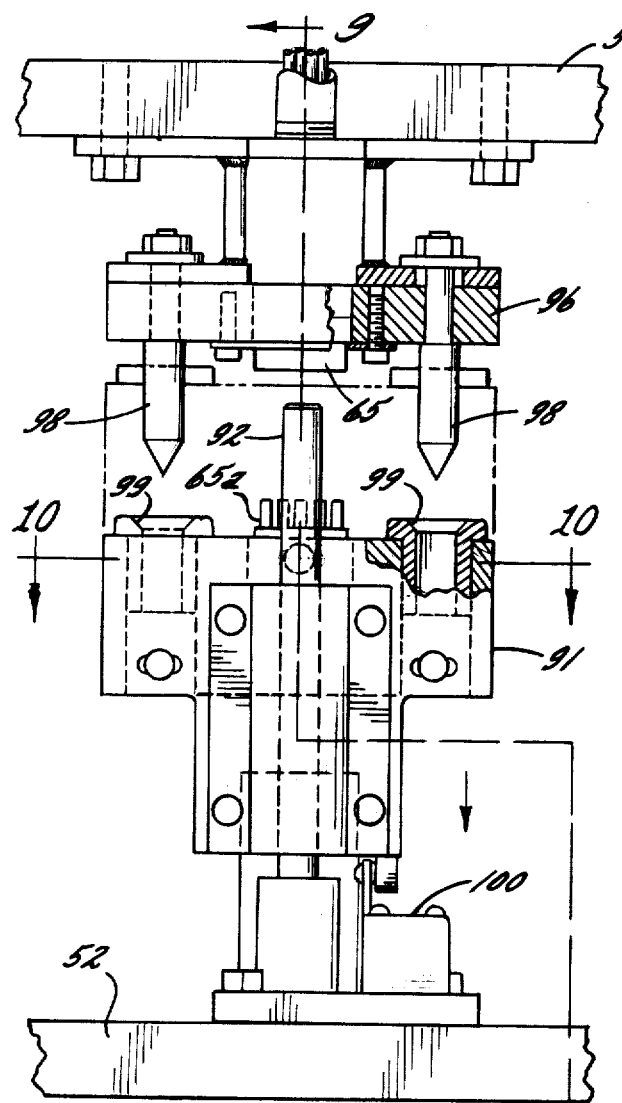
Figure 9:
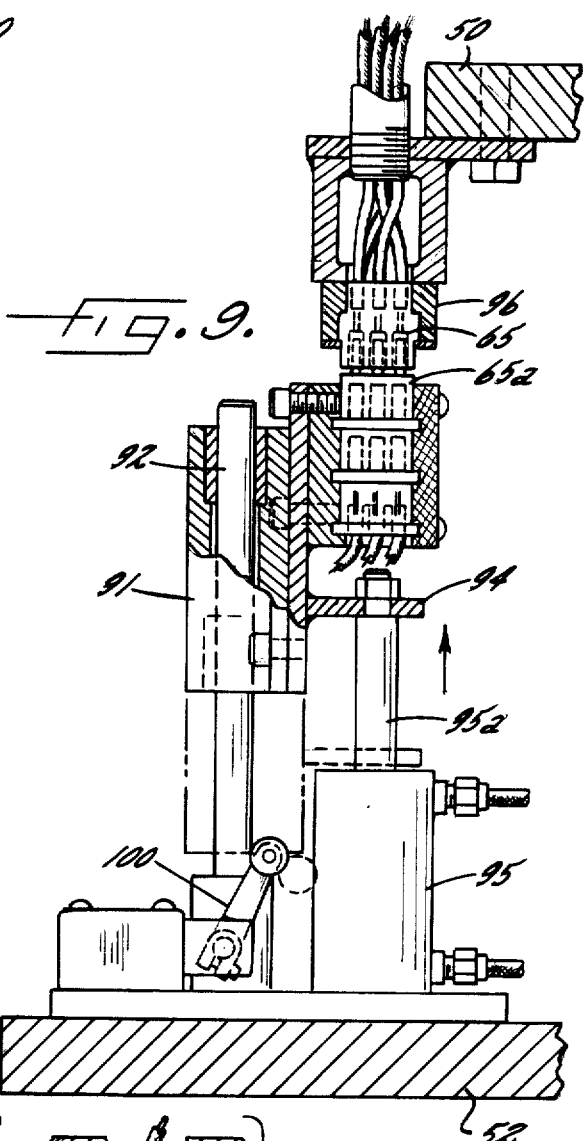
Figure 10:
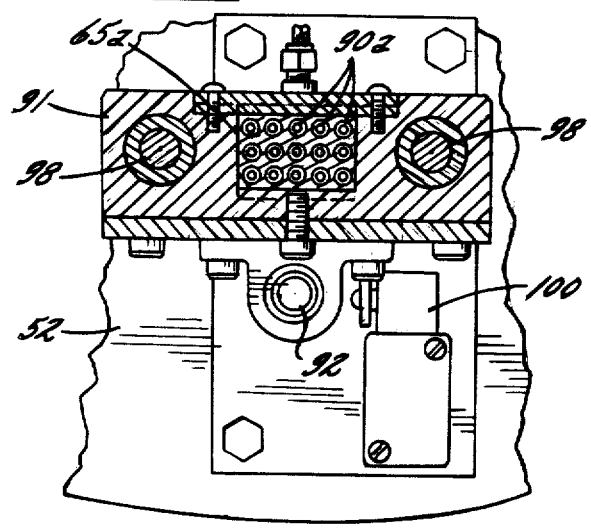
Figure 11:
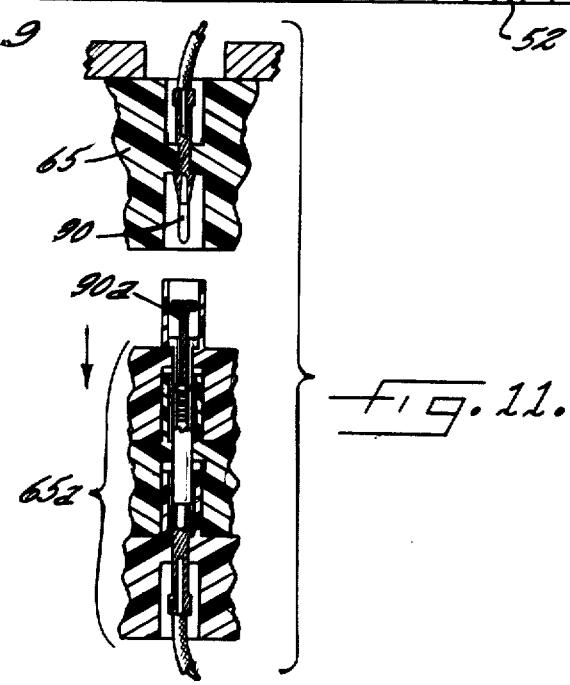
Figure 12:
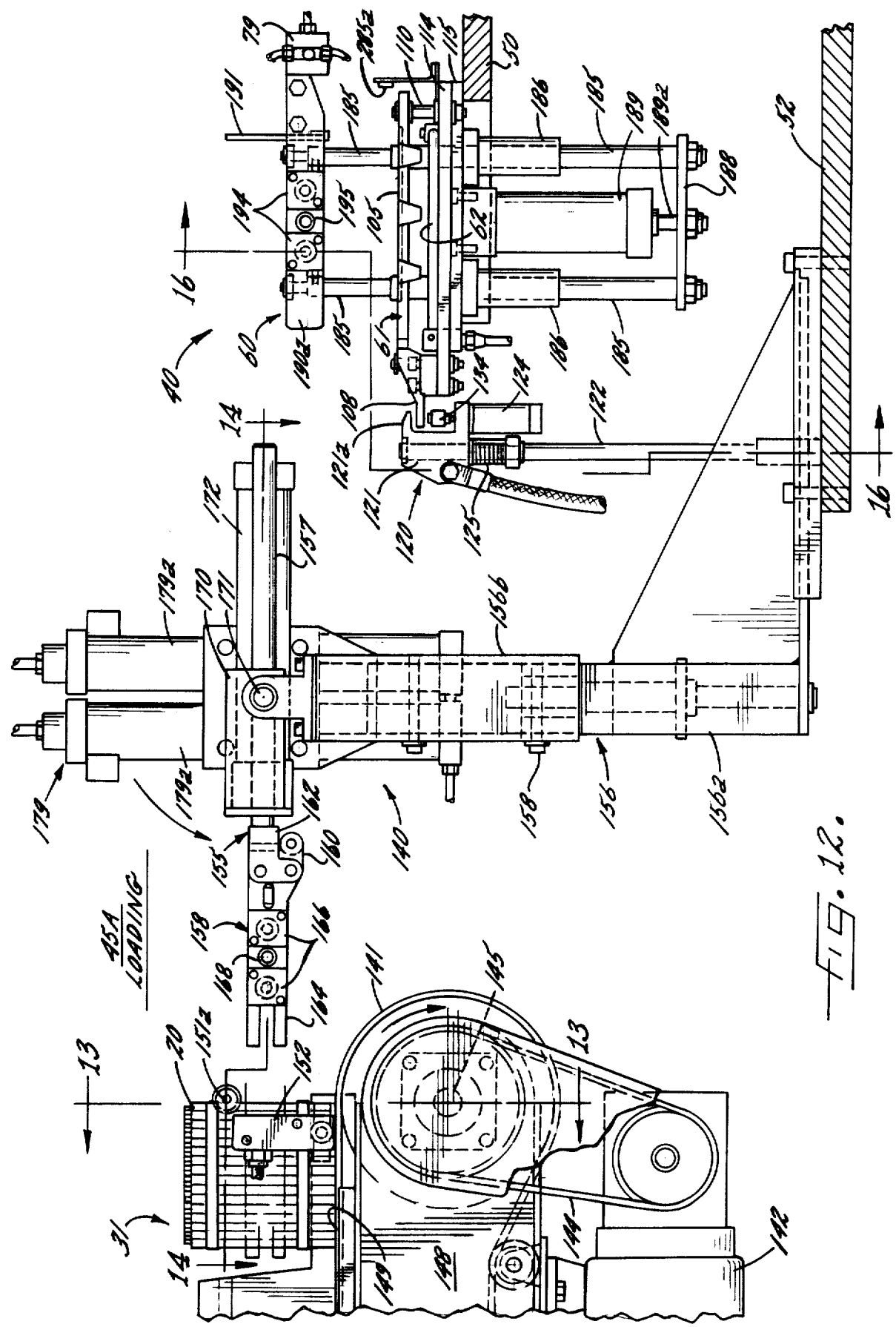
Figure 13:
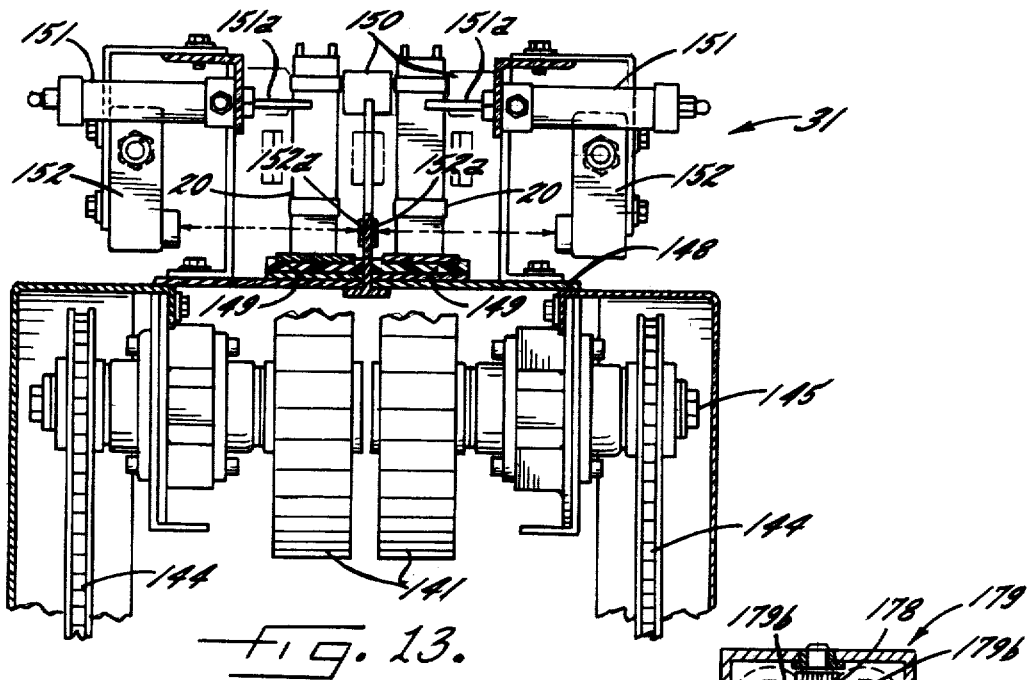
Figure 14:
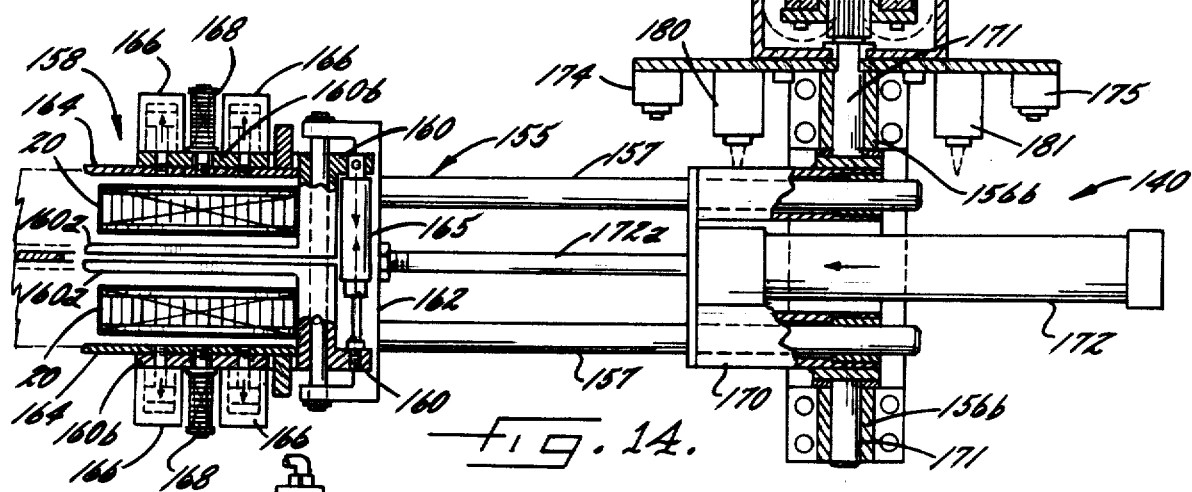
Figure 15:
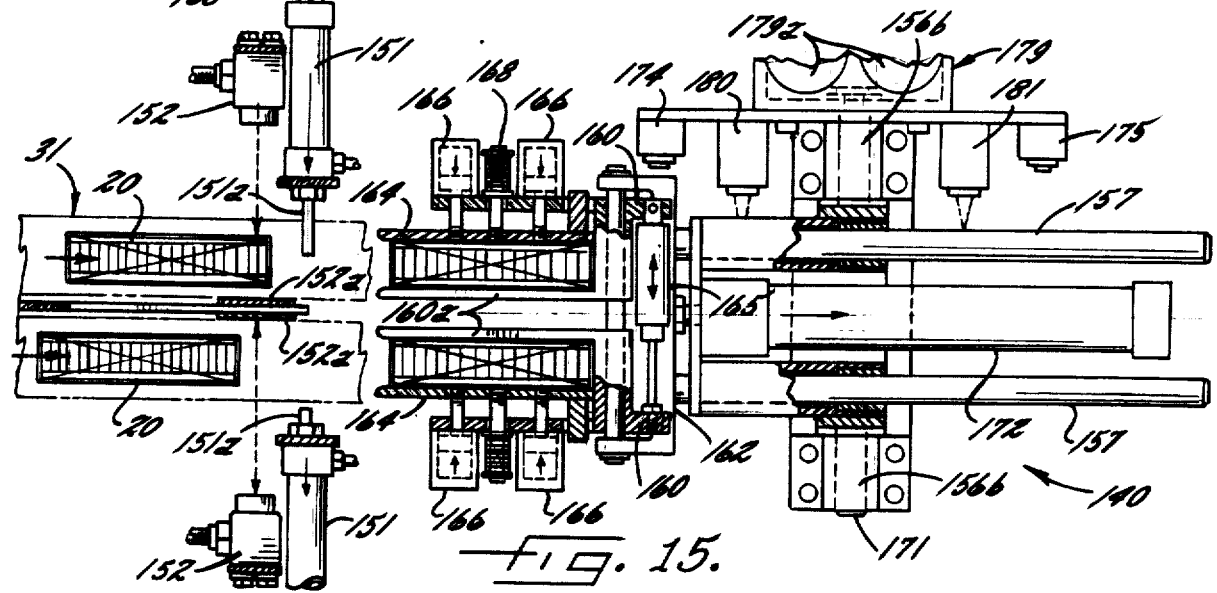
Figure 23:
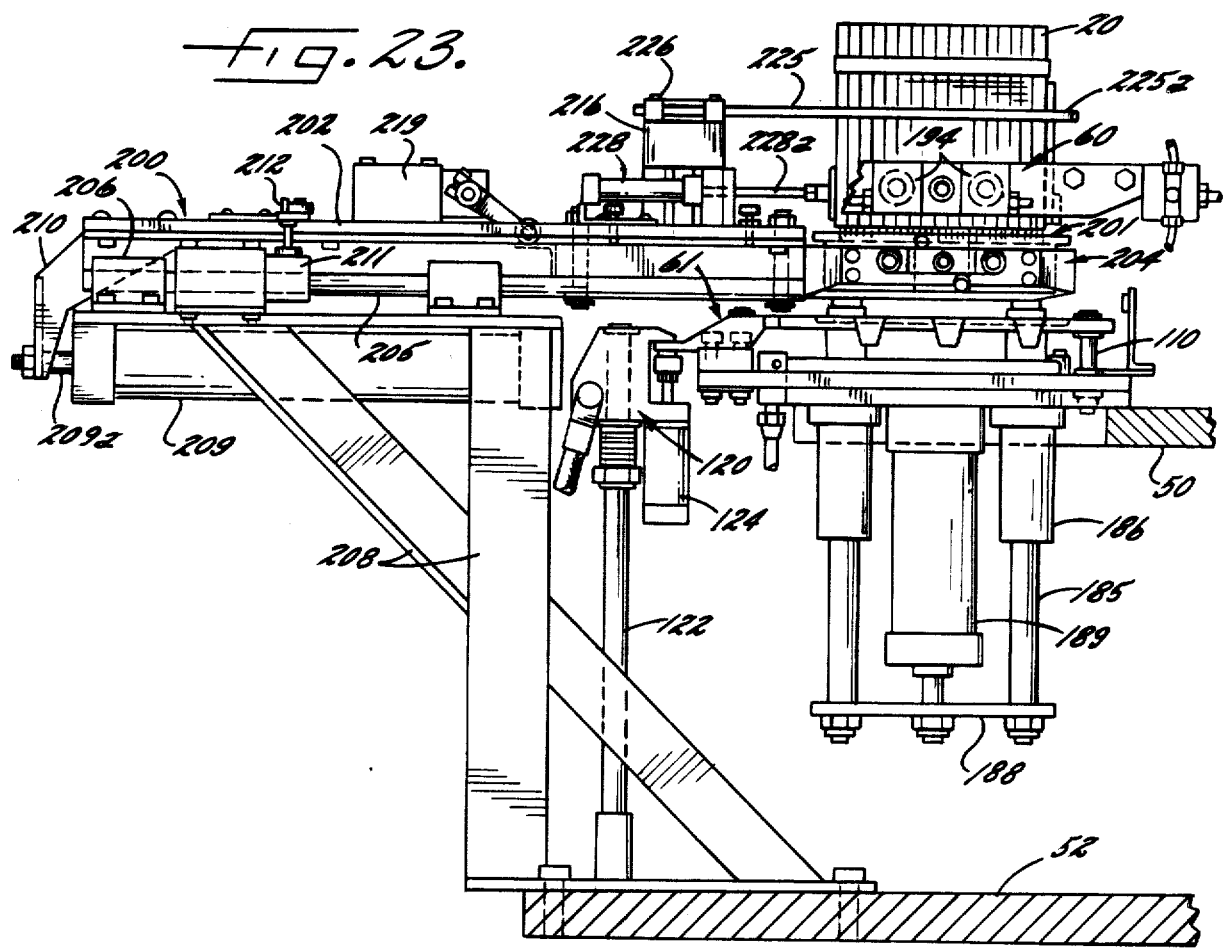
Figure 25:
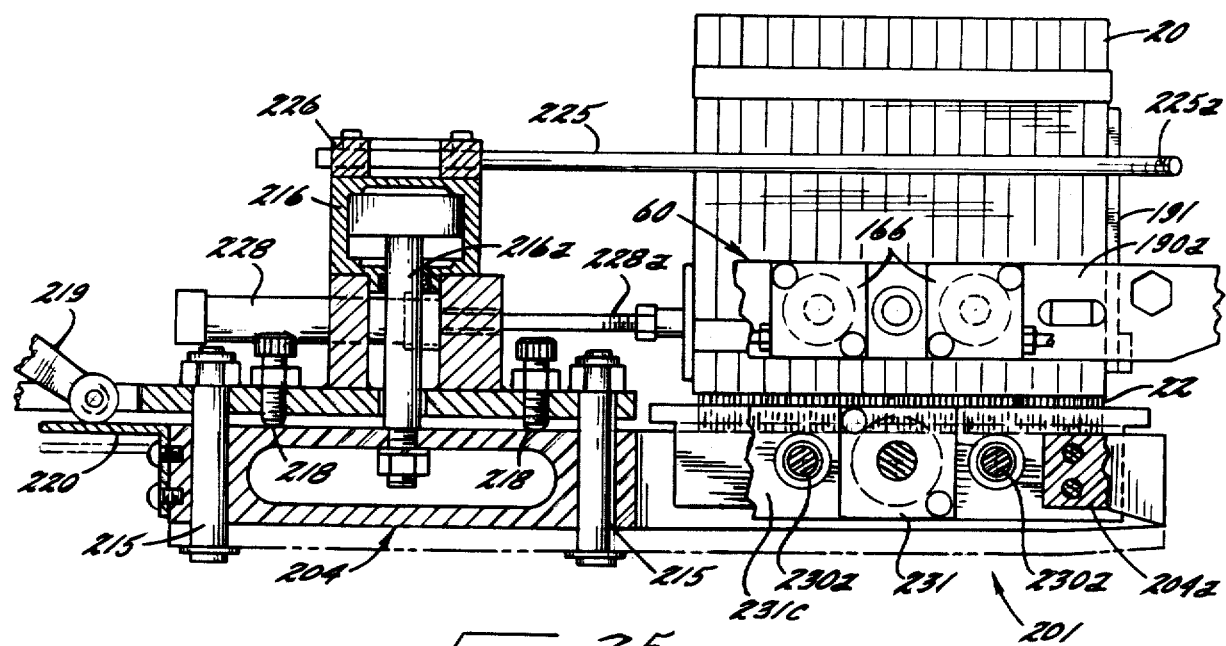
Figure 28:
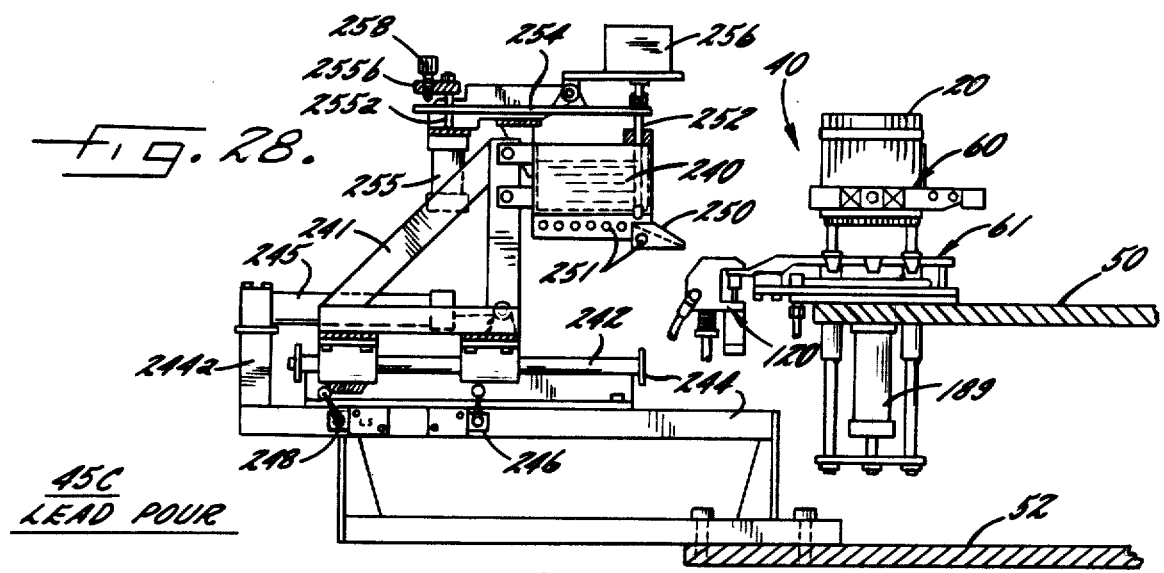
Figure 28A:
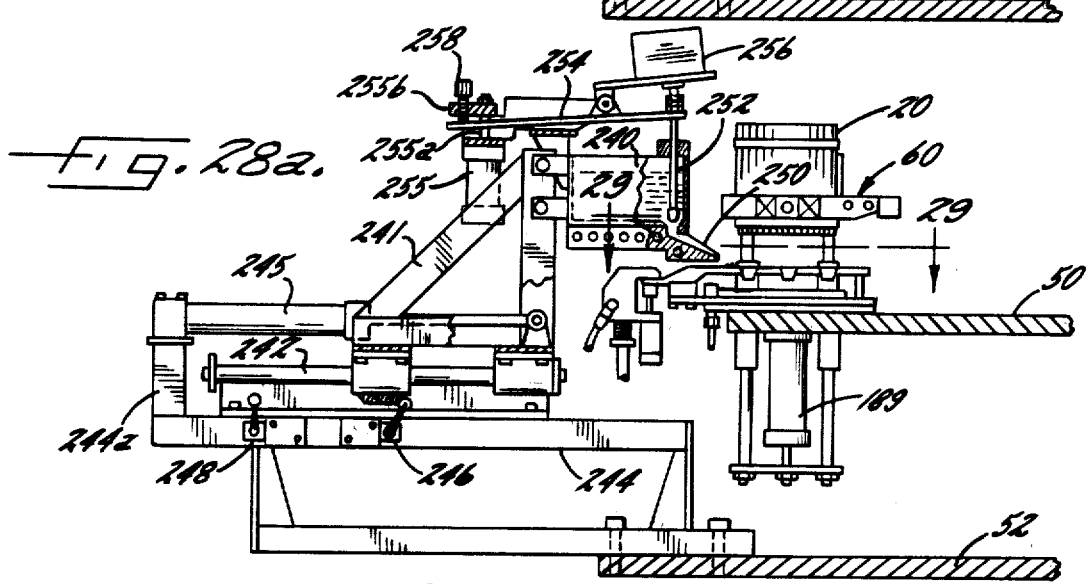
Figure 29:
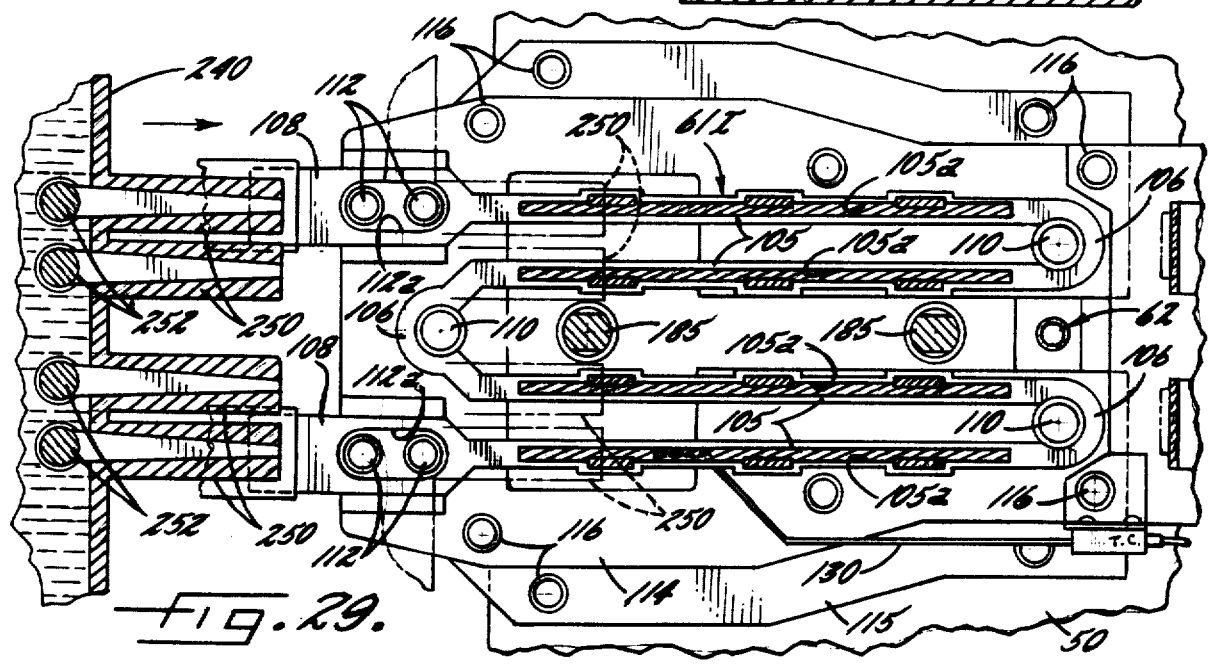
Figure 30:
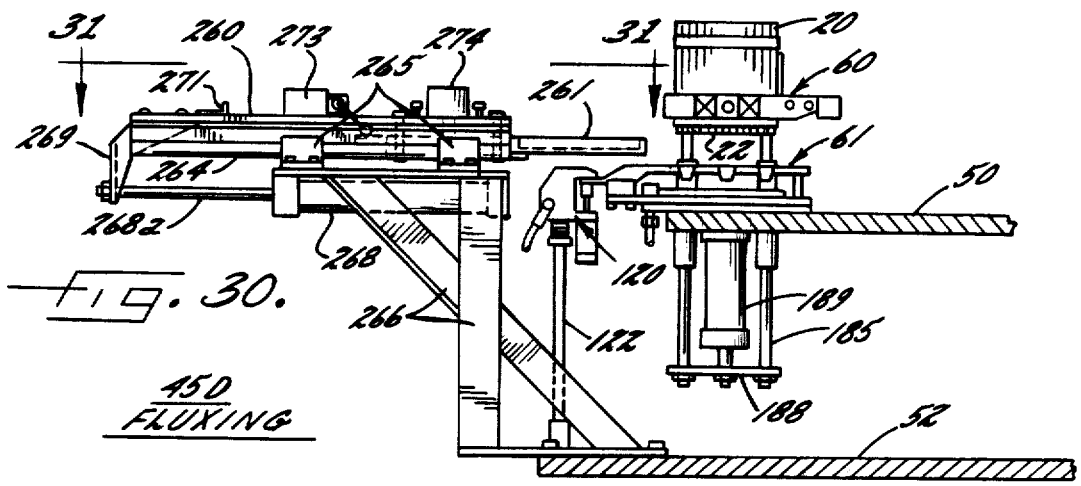
Figure 30A:
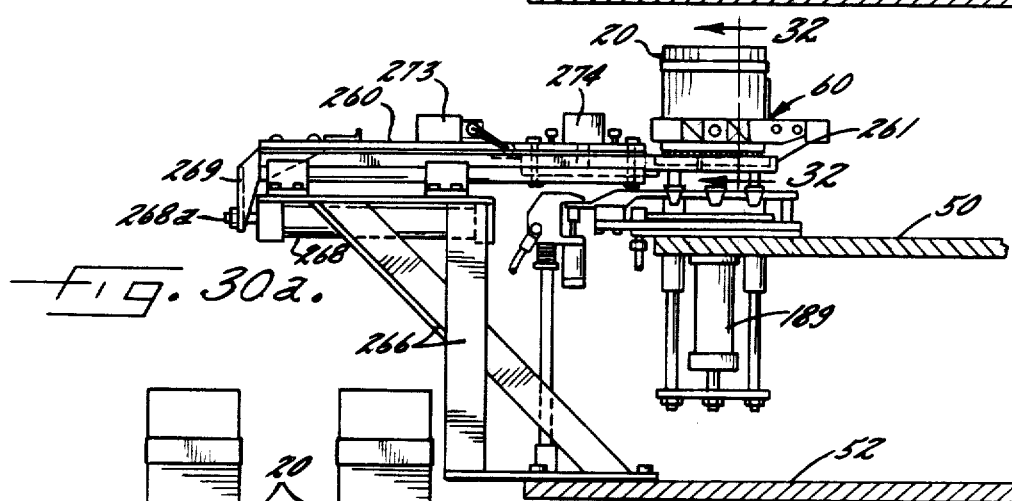
Figure 32:
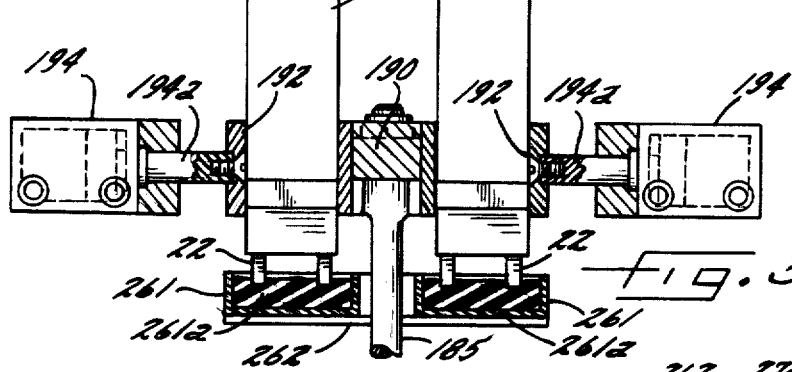
Figure 31:
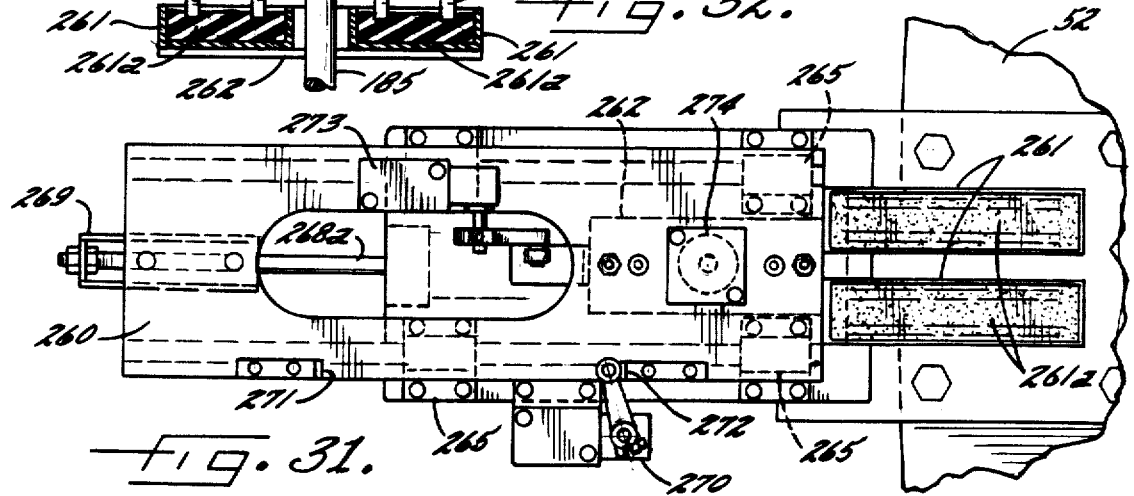
Figure 40:
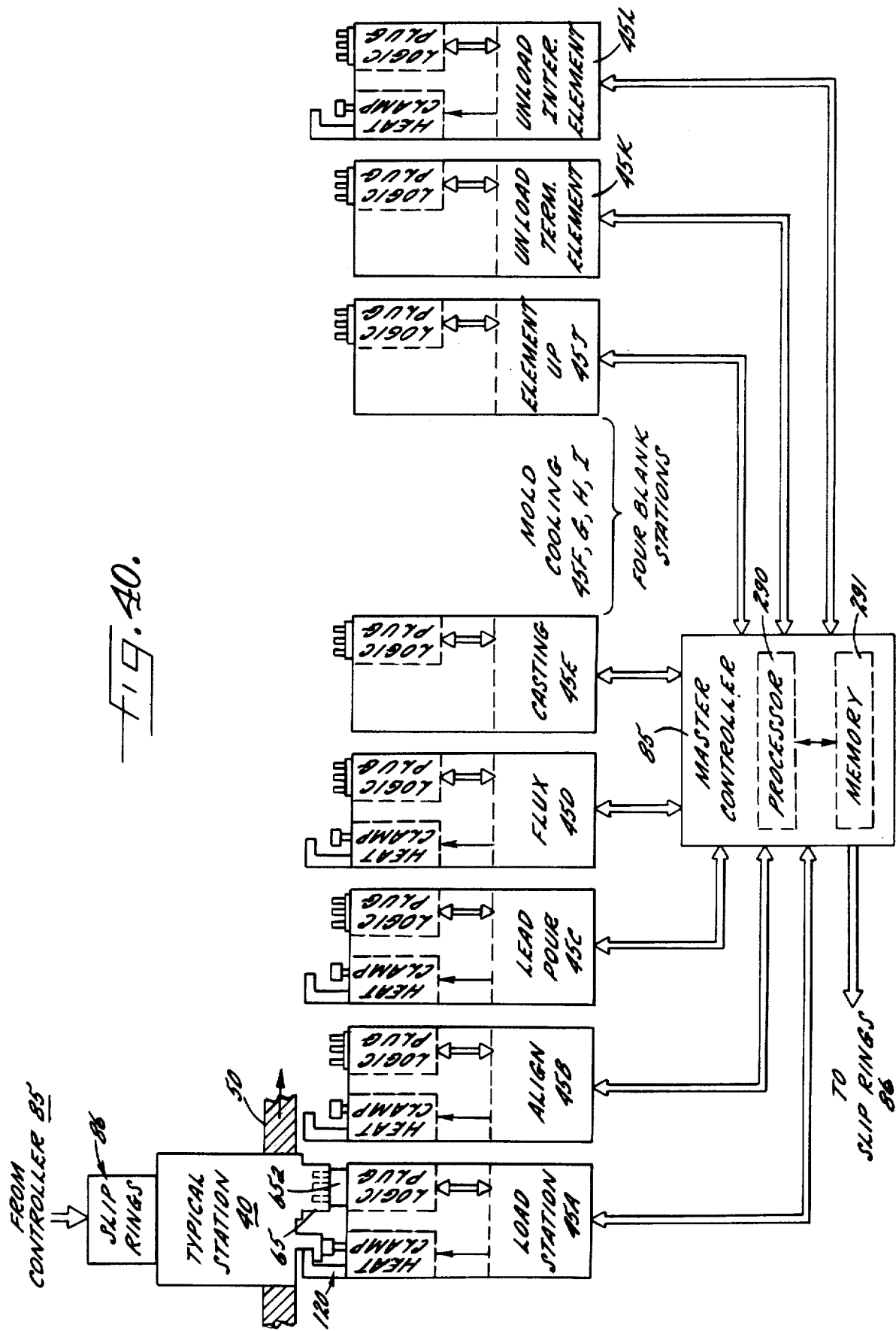
Figure 41:
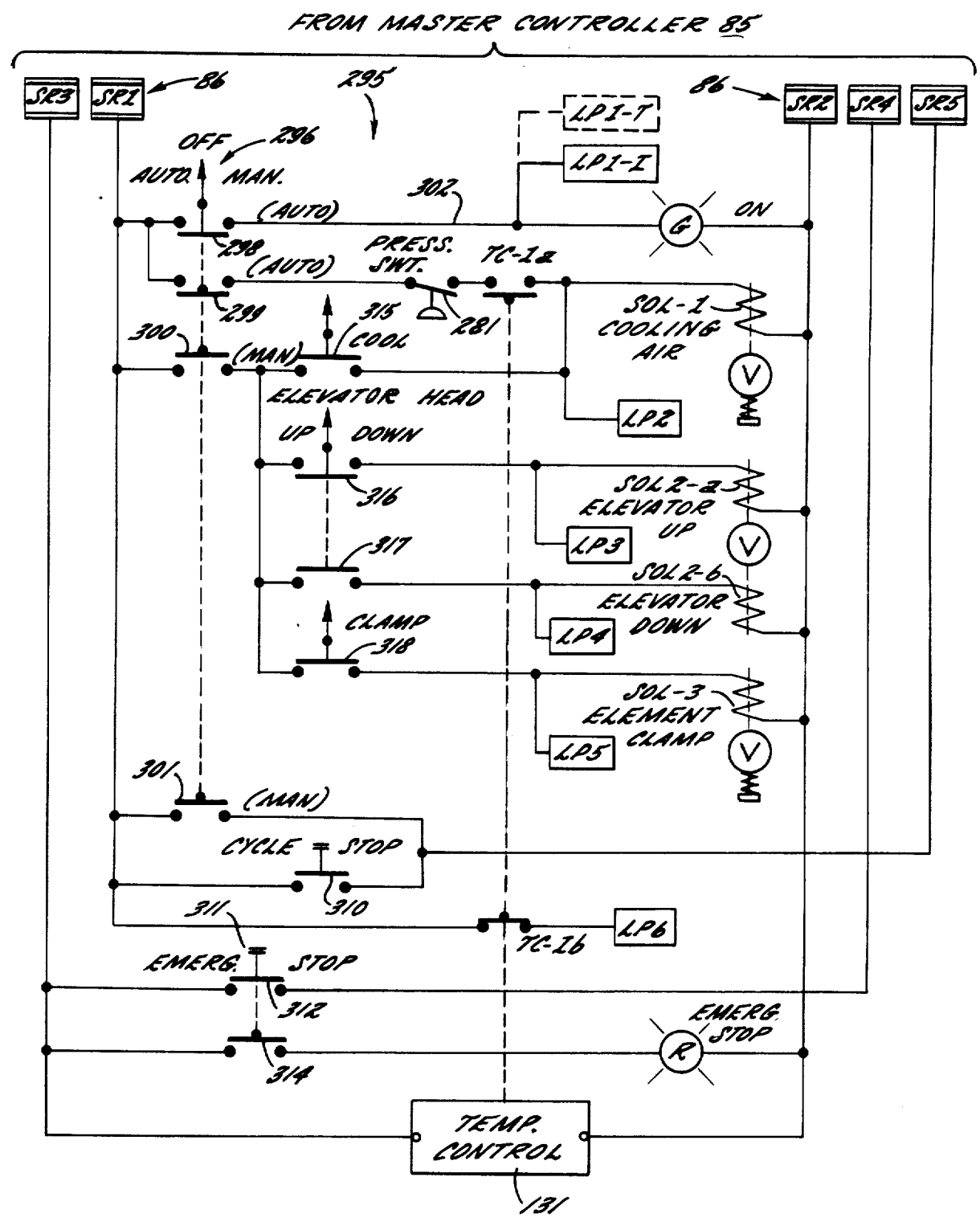

FIG. 8 is an enlarged vertical section taken in the plane of line 8—8 in FIG. 3, showing disconnectable logic means for coupling the master controller of the apparatus to a mold and element carrying station of the rotatable carousel at one operating station, with an operating station logic connector shown in solid lines in a lowered disconnected condition and in phantom lines in a raised connected condition;

FIG. 9 is a vertical section taken in the plane of line 9—9 in FIG. 8;

FIG. 10 is a horizontal section taken in the plane of line 10—10 in FIG. 8;

FIG. 11 is an enlarged fragmentary vertical section showing one of the spring-loaded logic pins of the logic coupling shown in FIGS. 8-10;

FIG. 12 is an enlarged side elevational view of the element loading station of the illustrated apparatus taken in the plane of line 12—12 in FIG. 3;

FIG. 13 is an enlarged vertical section of the element delivery conveyor at the loading station, taken in the plane of line 13—13 in FIG. 12;

FIG. 14 is an enlarged horizontal section of the element transfer mechanism at the loading station taken in the plane of line 14—14 in FIG. 12, showing the transfer arm thereof in an extended condition for engaging cell elements on the delivery conveyor;

FIG. 15 is a horizontal section, similar to FIG. 14, showing the element transfer mechanism at the loading station with elements withdrawn from the delivery conveyor;

FIG. 16 is an enlarged vertical section taken in the plane of line 16—16 in FIG. 12;

FIG. 17 is a vertical section taken in the plane of line 17—17 in FIG. 16, showing a carousel station mold engaged by an operating station electrical contact clamps for pre-heating the mold;

FIG. 18 is a side elevational view of the loading station element transfer mechanism with the transfer arm thereof extended positioning cell elements into a carousel station;

FIG. 19 is a horizontal section taken in the plane of line 19—19 in FIG. 18;

FIG. 20 is a horizontal section taken in the plane of line 20—20 in FIG. 18, showing the loading station element transfer mechanism in a retracted condition after having loaded elements into a carousel station;

FIGS. 21a-21e is a diagrammatic sequential illustration of the operation of the element transfer mechanism at the loading station;

FIG. 22 is an enlarged vertical section of the element alignment station of the illustrated apparatus taken in the plane of line 22—22 in FIG. 3;

FIG. 23 is an enlarged elevational view of the element lug alignment device at the alignment station in operative position for aligning lugs of cell elements carried by a carousel station;

FIG. 24 is an enlarged top view of the lug-alignment element device, taken in the plane of line 24—24 in FIG. 22;

FIG. 25 is an enlarged vertical section of the element lug-alignment device taken in the plane of line 25—25 in FIG. 24;

FIGS. 26 and 26a and FIGS. 27 and 27a are enlarged sections taken in the planes of lines 26—26 and 27—27, respectively, in FIG. 24 showing in FIGS. 26 and 27 the alignment device clamps in position to receive the unaligned lugs of elements and in FIGS. 26a and 27a the alignment-device clamps in aligning engagement with the element lugs;

FIG. 28 is an enlarged vertical section of the lead-pour station of the illustrated machine, taken in the plane of line 28—28 in FIG. 3;

FIG. 28a is a vertical section, similar to FIG. 28, but showing the molten-lead containing ladle in an advanced mold filling position;

FIG. 29 is an enlarged horizontal section taken in the plane of line 29—29 in FIG. 28a and showing the ladle being advanced to its lead-pour position;

FIG. 30 is an enlarged vertical section of the fluxing station of the illustrative machine taken in the plane of line 30—30 in FIG. 3;

FIG. 30a is a vertical section, similar to FIG. 30, but showing the fluxing device an an advanced operative position with the flux trays thereof below cell elements carried by a carousel station;

FIG. 31 is an enlarged top view of the fluxing device taken in the plane of line 31—31 in FIG. 30;

FIG. 32 is an enlarged vertical section taken in the plane of line 32—32 in FIG. 30a;

FIG. 33 is an enlarged vertical section of the casting station of the illustrated machine, taken in the plane of line 33—33 in FIG. 3;

FIG. 34 is an enlarged vertical section taken in the plane of line 34—34 in FIG. 33;

FIGS. 35 and 36 are enlarged fragmentary sections showing the lugs of cell elements immersed in the molten lead during the casting operation and the subsequent cooling operation;

FIG. 37 is an enlarged horizontal section taken in the plane of line 37—37 in FIG. 33;

FIG. 38 is an enlarged vertical section taken in the plane of line 38—38 in FIG. 3 showing the elevator head-up station of the illustrated apparatus with the cell elements removed from the molds after lug straps have been cast thereon;

FIG. 39 is a partial section taken in the plane of line 39—39 in FIG. 37;

FIG. 40 is a schematic of the master controller of the apparatus showing its coordination with a typical carousel station and the plurality of operating stations; and FIG. 41 is an electrical circuit diagram of a typical carousel station.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the invention is to cover all modifications, alternative constructions and equivalents falling within the spirit and scope of the invention.

Referring to FIG. 1, there is shown an illustrative completed battery 10 having cell elements with lug straps of the type cast by apparatus of the present invention. The illustrated battery 10, which is of a type generally similar to that shown in Klang et al. application Ser. No. 352,924 filed Feb. 26, 1982, includes a case 11 formed with a plurality of internal divider partitions 12 which form individual compartments for containing respective battery cells 14I or 14T. The illustrated battery 10 includes six cells, namely two outermost terminal cells 14T at opposed ends of the battery and four intermediate cells 14I located therebetween.

Each battery cell 14I, 14T includes a cell element 20, illustrated in FIG. 2, which comprises a plurality of positive and negative electrode plates arranged in alternate relation and with adjacent plates being separated by a serpentinely folded insulator sheet 21. Each plate has an integrally formed lug 22 located at a upper corner thereof, and the lugs 22 of like polarity plates are aligned along one side of the element 20 and the lugs 22 of plates of opposite polarity are aligned on the opposite side of the element 20. The plates of the illustrated battery cell element 20 have a height substantially greater than their width and are stacked in a row such that the long dimension of the element is transverse to the plane of the individual plates. For retaining the plates of each cell element 20 in a composite package during handling, strips 23 of tape surround the cell element.

In order to electrically couple the plates of like polarity of each cell element 20, the rows of plate lugs 22 each are joined by a respective cast lead strap 24I or 24T. The rows of plate lugs 22 adjacent the internal divider partitions 12 in the present instance each are joined by a strap 24I formed with a plurality of upstanding tabs or tombstones 25 which are disposed adjacent appropriate apertures in the respective partition 12. Such straps 24I are provided on both rows of lugs of the elements in the intermediate cells 14I and on the row of lugs of each element in the terminal cells 14T adjacent a partition 12. As is known in the art, elements in battery cells 14I, 14T can be electrically connected in series by appropriate intercell connections of adjacent tombstones 25 through the respective apertured partitions 12.

The outermost row of lugs on elements in each terminal cell 14T, on the other hand, has a strap 24T upon which a terminal post 26 is mounted. It will be understood that such terminal post strap 24T may be integrally formed with a terminal post 26, or alternatively, the post may be separately mounted or cast on the strap. In the illustrated apparatus, the terminal post straps 24T are cast with an upstanding ledge 28, as illustrated in FIG. 6, upon which a terminal post may be subsequently cast.

Referring now to the remaining figures, and particularly FIGS. 3 and 4, there is shown an illustrative apparatus 30 embodying the present invention for continuously delivering pairs of battery cell elements 20 along a single delivery conveyor 31 to a multiple station mold and element carrying carousel 35, casting straps 24I on cell elements 20 carried at some of the carousel stations for intermediate battery cells 14I and straps 24I and 24T on cell elements 20 carried at other of the carousel stations for terminal battery cells 14T, and thereafter transferring the completed elements for terminal cells 14T to one discharge conveyor 36 and the completed elements for intermediate cells 14I to a second discharge conveyor 38. The illustrative carousel 35 includes twelve substantially similar mold and element carrying stations 40 (also more specifically designated 40I or 40T) with every third station 40T, or terminal cell element station, having a mold for casting one tombstone strap 24I and one terminal post receiving strap 24T on each element carried at such station and the two succeeding stations 40I, or intermediate cell element station, each having molds for casting pairs of tombstone straps 24I on the battery cell elements 20 carried at such stations. As will become apparent, the illustrated carousel 35 is adapted to simultaneously process battery cell elements for four six cell lead acid batteries, with every third carousel station 40T casting straps on elements for two terminal cells 14T and the two succeeding stations 40I casting straps on elements for four intermediate battery cells 14I.

In accordance with an important aspect of the invention, the carousel is adapted to successively and continuously index the mold and element carrying stations through a succession of precisely controlled operating stations to cast the lug straps under optimum conditions and on an efficient and uninterrupted basis. In the illustrated apparatus, as depicted in FIG. 3, the carousel 35 indexes each carousel station 40 successively through twelve operating stations 45 (also more specifically designated 45A–45L) including (1) a loading station 45A where a pair of cell elements 20 are transferred from the delivery conveyor 31 into a carousel station 40, (2) an alignment station 45B where the rows of lugs 22 of elements carried in the carousel station are more precisely aligned, (3) a lead-pour station 45C where the mold carried in the carousel station is filled with molten lead, (4) a fluxing station 45D where flux is applied to the element lugs 22, (5) a casting station 45E where the element lugs are immersed in molten lead contained in the carousel station mold, (6) cooling stations 45F, 45G, 45H, 45I where the molten lead in the mold is cooled and solidified, (7) an elevator head-up station 45J which verifies that the molds have been cooled to a predetermined temperature and lifts elements from the mold, (8) a terminal-cell element unloading station 45K where terminal-cell elements with straps 24T, 24I cast thereon are transferred from a terminal-cell element carousel station 40T to the first discharge conveyor 36, and (9) an intermediate-cell element unloading station 45L where intermediate-cell elements with straps 24I cast thereon are transferred from an intermediate cell element carousel station 40I to the second discharge conveyor 38. The empty carousel station 40 is thereupon again indexed to the loading station 45A for receiving another pair of cell elements 20 for repeat of the casting cycle.

The illustrated carousel 35, as best shown in FIG. 7, includes a rotary table 50 mounted on a rotary indexer 51, which in turn is mounted on an elevated base plate 52 of the apparatus frame 54. The carousel table 50 has a centrally disposed upstanding frame 55 and carries the plurality of carousel stations 40 at circumferentially spaced locations about its outer periphery. The indexer 51 may be of a known type, which upon energization can selectively rotate the table 50 and the carousel stations 40 carried thereby to the successive operating stations 45. Since there are twelve evenly spaced operating stations 45 in the illustrated apparatus, the indexer 51 in this case indexes the carousel incrementally 30° between successive stations. For sensing the rotative position of the carousel 35, the indexer 51 has an output shaft 56 carrying a cam 58 which engages a suitable limit switch 59.

Each of the carousel stations 40 is substantially similar, including an element holding elevator head 60 for receiving and carrying pairs of battery cell elements 20, a mold 61 (also more specifically designated 61I or 61T) arranged below the elevator head 60 for simultaneous casting lug straps on both cell elements 20 carried at such carousel station, mold cooling means including an air-discharge tube assembly 62 disposed in close proximity to the mold 61, a station control panel 64 mounted on the upstanding carousel frame 55, and disconnectable control coupling means including a logic connector 65 for coupling the carousel station 40 to a master controller for the apparatus through an operating station at which it is located. The carousel stations 40T and 40I differ in mold cavity configuration, as indicated above, depending upon whether the carousel station is to cast straps on elements for terminal or intermediate cells 14T or 14I.

For supplying air to the respective carousel stations 40 on the rotary table, an air supply line 66 on the underside of the frame plate 52 is connected through a rotary union 68 to a T-shaped air supply line 69 carried for rotation with the table 50. The supply line 69 has one outlet of the T fitting coupled through a pressure regulator 70 to a mold-cooling air supply manifold 71, which in turn is connected through lines 74 with a respective cooling-air, solenoid-actuated, control valve SOL-1 for each carousel station 40. The other outlet end of the T fitting of air supply line 69 is connected through a line 75 to another T fitting 76, one end of which is coupled through a pressure regulator 78 to a series of elevator-head clamping, solenoid-actuated control valves SOL-3 for the respective carousel stations 40, which in turn are respectively connected through lines 80 to an elevator head-clamping air manifold 79 for each station. The other end of the T fitting 76 is connected through a pressure regulator 81 to a series of double actuating, solenoid-actuated control valves, designated SOL-2a, SOL-2b, for controlling the raising and lowering of the respective carousel station elevator heads 60, as will be as described later.

For coupling the carousel 35 to a master controller 85 for the apparatus and for supplying electrical power to the carousel, a slip ring assembly 86 is mounted at the upper end of the carousel frame 55. The slip ring assembly 86 is contained within a housing 87 fixed to the top of the carousel frame 55 and has a stator 86a supported by bearings 88, 89 that permit relative rotational movement of the carousel. The slip ring assembly 86 has a plurality of pick-up leads 86b mounted within the housing 87 which are electrically coupled to the respective carousel stations 40.

To permit further selective coupling of the individual carousel stations 40 to a master controller 85 of the machine while located at an operating station, each carousel station logic connector 65 is supported in depending fashion from the underside of the rotary table 50 and is selectively engageable by a respective operating station logic connector 65a, as shown in FIGS. 8–11. Each carousel station logic connector 65 in this instance has a plurality of male logic pins 90 which are adapted to engage a corresponding number of spring biased female logic pins 90a carried in an operating station logic connector 65a.

For selectively engaging the logic connectors 65, 65a upon indexing of a carousel station 40 to an operating station 45, each operating station logic connector 65a is mounted in a bracket 91 which in turn is supported for vertical movement on an upstanding guide rod 92 mounted on the frame plate 52. The mounting bracket 91 has a flange 94 secured to the upstanding end of a rod 95a of a pneumatic cylinder 95, which upon actuation, raises the logic connector 65a into operative engagement with the connector 65 of a carousel station. To facilitate reliable engagement of the logic connectors, the carousel logic connector 65 is mounted in a plate 96 which in turn is mounted on the underside of the rotary table 50 for transverse floating movement. The plate 96 has a pair of depending locator pins 98 with tapered lower ends for engaging tapered bushings 99 (FIG. 8) carried by the operating station logic bracket 91 for guiding the logic connector 65 on its floating mounting plate 96 into proper alignment. A limit switch 100 is provided for sensing the raised or lowered condition of the operating station logic connector 65a.

It will be appreciated that operating station logic connectors 65a can be provided at each operating station 45 where it is desired to control or monitor the operation of a carousel station through the master controller 85 of the apparatus, as will become apparent. In the illustrated apparatus, an operating station logic connectors 65a are provided at each operating station 45, except the four cooling stations 45F–45I.

In accordance with another aspect of the invention, the mold for each carousel station is adapted for relatively quick and precisely controlled heating and cooling. As shown in FIGS. 12 and 29, the illustrated molds 61I, 61T each has a one-piece serpentine configuration that includes four elongated sections 105 which each define a mold cavity 105a for one of the lug straps to be cast. The elongated sections 105 are disposed in parallel transversely spaced relation and are integrally connected by arcuate end mounting portions 106. The two outermost mold sections 105 terminate in a pair of terminal flanges 108 extending outwardly of the periphery of the carousel table 50. The design of the mold cavities 105a, as previously indicated, is dependent upon whether the carousel station 40 at which it is carried is to cast straps on elements for terminal or intermediate battery cells 14I or 14T (FIG. 4). Intermediate cell element carousel stations 40I have molds 61I with cavities designed to cast only tombstone straps 24I on the cell elements carried thereby, while terminal-cell element carousel stations 40T have molds 61T with cavities for casting or molding one tombstone strap 24I and one terminal post receiving strap 24T on each cell element 20.

Each mold 61I, 61T is mounted on upstanding posts 110 with the elongated cavity-containing sections 105a in elevated position. To permit horizontal expansion and contraction of the mold sections 105, the mold is mounted on the posts 110 between the elongated sections 105 and is carried between snap rings 111 (FIG. 39). The terminal flanges 108 of the mold are secured by bolts 112 with the heads thereof recessed in elongated counterbores 112a in the flanges (FIG. 29). To permit quick change or replacement of the mold 61, the mold mounting posts 110 and bolts 112 are secured in a mold mounting plate 114, which in turn is secured to a base plate 115 by bolts 116, which in turn is carried by the carousel table 50. Removal of the mold mounting plate bolts 116 thereby enables easy replacement of the mold 61 and mounting plate 114 assembly.

In keeping with the invention, each mold has a lightweight construction and is adapted for quick electrical resistance heating and rapid forced air-cooling during the successive casting operations. The molds 61 preferably are made of stainless steel having an electrical resistivity sufficient to create the desired heating upon application of electrical current thereto. Type 303 (industry standard) stainless steel has been found to be quite suitable for the molds and has an electrical resistivity at 68° F. of 73 microohm-cm and at 720° F. of 96 microohm-cm. Other stainless steels in the 300 and 400 series also have acceptable resistivity and will be satisfactory for making the molds. The material being cast need not be limited to lead and lead alloys as other non-ferrous metals and other materials may also be cast or molded using this type of mold and mold heating method by selecting the appropriate time and electrical current to achieve the desired heating. The elongated molds 61, including the cavity containing sections 105, preferably have substantially uniform, relatively thin walls for enhancing uniform heating and cooling. For heating the molds, the terminal flanges 108 thereof may be connected to an electrical source so as to conduct current through the one-piece serpentine mold configuration, thereby heating the mold by the electrical resistance of the mold itself. It will be appreciated that such electrical resistance heating can be effected quickly and efficiently with minimal heat losses and is susceptible to relatively precise temperature control. Further details of the electrically heatable mold and the method of casting are set forth in the Oswald and Wolf application identified herein, and such disclosure is incorporated herein by reference.

For selectively coupling of the terminal mold flanges 108 to an electrical source remote from the turntable 52 for mold heating purposes, electrical contact-clamps 120, shown in FIGS. 16 and 17, are mounted at selected of the operating stations 45 where mold heating is desired. Upon indexing of the carousel station 40 to such operating station, the clamps 120 can be brought into engagement with the outwardly extending terminal mold flanges 108. The clamps 120 for each operating station includes a pair of contact-clamp heads 121 mounted at the upper end of respective upstanding support rods 122 carried by the frame plate 52 at the operating station. As shown in FIG. 17, each clamp head 121 has a mold flange-contacting jaw 121a and a lower spaced flange 121b carrying single actuating spring return air cylinder 124. The air cylinder 124 has a cylinder rod 124a extending into the space between the jaw 121a and flange 121b such that, upon actuation of the cylinder 124, the mold flange 108 is engaged between the clamp jaw 121a and end of the cylinder rod 124a.

The clamps 120 in this case each have a floating mounting on the support rods 122 to facilitate positioning of the mold flanges into the clamp upon carousel indexing. To this end, the clamp heads 121 are mounted for relative movement on the support rods 122 on springs 125 interposed between the underside of the clamp heads 121 and the top side of a fixed bracket 126 mounted to each of the support rods 122. With the cylinders 124 in retracted or clamp-open condition, as shown in FIG. 12, the clamp heads 121 rest on the springs 125 in an opened uppermost position so as to permit terminal flanges 108 of a mold carried at a carousel station to be easily moved into the clamp. With the mold flanges 108 so positioned, actuation of the cylinder 124 will cause the cylinder rod 124a (FIG. 17) thereof to move into engagement with the underside of the mold flanges 108, such that further extension of the rod 124a in closing the clamp will draw the clamp heads 121 downwardly on their support rods against the biasing force of the springs 125. When the carousel station is again to be indexed, the spring return cylinders 124 are de-energized to retract the rods 124a, allowing the clamp heads to return to their raised opened position.

The heads 121 of the electrical contact clamps 120 can be coupled to a suitable electrical source at operating stations where the clamps are located and mold heating is required. The molds 61 preferably are heated by passing of the required electrical current to the molds through such contact-clamps 120 at successive of the operating stations, prior to lead pouring, until they are brought to a suitable preheated temperature, which should be in excess of the melting point of molten lead to be introduced into the mold, sufficiently high to activate the type of flux to be applied to the element lugs prior to casting, but below a temperature which would cause melting of the element lugs during casting. In the illustrated embodiment, electrical contact-clamps 120 are located at the intermediate-cell element unloading station 45L, the loading station 45A, the alignment station 45B, the lead-pour station 45C, and the fluxing station 45D to permit mold heating at the successive stations prior to both mold filling and casting. It will be appreciated that, since the mold heating current can be supplied from a number of different operating stations remote from the carousel, adequate current can be provided for simultaneous heating of molds at a plurality of carousel stations without limitations otherwise imposed by directing such heating current to the carousel through the slip ring assembly 86. By virtue of the construction of the molds, the manner of heating, and the ability to heat the molds at successive operating stations, it is possible to maintain the molds of each table station at a desired preheated condition with relatively precise control.

For monitoring the temperature of each mold 61 at the various carousel stations 40, a thermocouple 130 is mounted in each mold 61 and is connected to a respective carousel station temperature-controller 131 (FIG. 29) having low and high temperature set-points. The high temperature set-point preferably should be the desired preheat temperature of the mold, or just slightly below such temperature, and the low set-point should be the desired temperature of the mold after cooling sufficiently to permit removal of the casting without damage thereto. For most accurate temperature monitoring, the thermocouple 130 preferably is connected to the body of the mold at a central location along an elongated mold section 105 and extends into the mold to a point in close proximity to the cavity wall.

Typically the heating sequence of the above identified preheat stations is as follows. Each station is preheated for a period of 4½ seconds at a voltage of 11 volts and an initial current of 750 amps. This produces a temperature increase of approximately 50° F. per second. In continuous operation the normal mold temperature at the beginning of each cycle of operation is initially about 200° F. to 250° F., thus the desired high temperature set-point will normally be achieved early in the heating step at the third preheat, or alignment, station, thereby turning off the current flow to that station until the temperature controller senses a drop in temperature below the high set-point and the master controller reactivates the current flow. During any periods of interruption in the operations cycle, the preheat stations will continue their on-off heating cycle to maintain the mold temperature at the set-point once that temperature is obtained. Typically the molds are heated at the lead-pour station and the fluxing station to maintain the desired temperature by supplying an electrical voltage of 6 volts and a current of 400 amps. At the fluxing station, heating is continued for 4½ seconds, whereas the heating at the lead-pour station is limited to the time remaining after the completion of the lead-pour step and typically will be on the order of approximately ½ to 1 second. During periods of interruption of the operations cycle, the heating of these stations will continue in the same manner as for the above described preheat stations.

Because of the current flow through the molds during their heating, the clamps 120 and molds 61 are insulated from the portions of the apparatus upon which they are supported. The clamp heads 121 in this case are mounted on plastic sleeves 132 (FIGS. 16 and 17), a plastic cap 134 is carried at the end of the clamping cylinder rod 124a, and the cylinder rod 124a and cylinder 124 are suitably insulated from the lower clamp-head flange 121b by a sleeve and plate 135. The mold support posts 110 each also are insulated from the mounting plate by sleeves 136 (FIG. 39), and appropriate insulating sleeves and spacers, including spacers 138, 139, insulate the mold flanges 108 and mounting bolts 112 from the mounting plate 114 (FIG. 17).

Referring now specifically to the loading station of the apparatus, shown in FIGS. 3 and 12, the delivery conveyor 31 conveys cell elements 20 in their normal upright position, with the lugs 22 thereof on the top side, to a pick-up location at the end of the conveyor where a transfer mechanism 140 engages pairs of elements 20, inverts and transfers them in inverted position to the element holding elevator head 60 of a carousel station 40. The delivery conveyor 31, best shown in FIGS. 12 and 13, includes a pair of independently driven conveyor belts 141 adapted to move two transversely spaced rows of elements 20 in the direction of the transfer mechanism. The conveyor belts 141 are driven from a single drive motor 142 through independent drive trains, each including a chain 144 driven by the drive motor 142 and belt drive shaft 145 carried in a bearing block 146 supported from the underside of a frame 148 of the conveyor. The upper horizontal portion of the conveyor belts 141, upon which the elements 20 ride, each are supported by appropriate belt guides 149. It can be seen that since the elements 20 are disposed in their normal upright position on the belts 141, they may be readily transported by the delivery conveyor with only guide blocks 150 mounted adjacent the upper portions of the elements.

To stop pairs of moving elements 20 at the pick-up location adjacent the delivery end of the conveyor 31, a pair of movable stop-pins are disposed at the ends of the respective belts 141. The stop-pins 151a are actuated by respective air cylinders 151 transversely supported by the conveyor frame 148 (FIG. 13). When a pair of elements reach the stop-pins 151a so as to be ready for pick-up by the transfer mechanism 140 (FIG. 14), the cylinders 151 may be actuated to withdraw the pins 151a. Upon removal of the elements 20 by the transfer mechanism, respective photocells 152 will detect light from associated reflector plates 152a, as illustrated in FIGS. 13 and 15, to generate a signal for again returning the stop-pins to their extended, or element stopping, positions.

The loading station transfer mechanism 140, best shown in FIGS. 12, 14, 15 and 18–21, includes an extensible and pivotable transfer arm 155 mounted on a support bracket 156 extending outwardly from the frame plate 52. The support bracket 156 in this case includes lower upstanding support channels 156a and an upper yoke 156b selectively positionable on the channels 156a. The yoke 156b is secured by bolts 158 at a selected position for establishing the desired elevation of the transfer arm 155.

The transfer arm 155 includes a pair of elongated guide rods 157 with a clamping head 158 mounted at an outermost end thereof adapted for engaging elements at the discharge end of the delivery conveyor. The clamping head 158 in this case comprises a pair of U-shaped clamp members 160 mounted for relative transverse sliding movement on a shaft 161 carried between flanges of a cross-bar bracket 162 fixed at the ends of the guide rods 157. The clamp members 160 each have an inner leg 160a, disposed in closely spaced adjacent relation to each other, and an outer leg 160b which carries a transversely movable clamping bar 164. For moving the clamp members 160, and thus the inner legs 160a thereof, to opposed outwardly directed element-engaging positions, a double-acting air cylinder 165 is interposed between rearwardly-extending flanges of the respective clamp members 160. To move the clamp bars 164 inwardly relative to their respective support legs 160b toward element-engaging positions, a pair of single-acting cylinders 166 are mounted on the outside of each clamp leg 160b with their cylinder rods extending through the clamp leg 160b and carrying the respective clamp bar 164. The clamp bars 164 each are biased toward their open, or element releasing, position by a spring 168 acting on a shaft coupled to the clamp bar and extending outwardly through the clamp leg 160b.

Actuation of the clamping-head cylinders 165 and 166, therefore, moves the clamp bars 164 and legs 160a from an open, or element-receiving position, such as shown in FIG. 14, to an element-engaging position, such as shown in FIG. 15. Deactivation of the clamp bar cylinders 166 and reverse actuation of the clamp member cylinder 165 will again return the clamp members of transfer-arm head 158 to an open, or element-receiving or releasing, condition.

For extending and retracting the transfer-arm 155, the transfer-arm guide rods 157 are mounted for relative sliding movement in a pivot bracket 170 which in turn carries a pair of outwardly extending support shafts 171 pivotably mounted in the support bracket yoke 156b. The pivot bracket 170 has centrally mounted thereon a double-acting air cylinder 172 having a cylinder rod 172a secured to the cross-bar 162 of the transfer-arm head 158 (FIG. 14). Actuation of the air cylinder 172 moves the transfer-arm 155 to an extended position enabling the clamping-head 158 to receive and engage elements 20 on the delivery conveyor 31, as shown in FIG. 14, and then be returned to a retracted position, as shown in FIG. 15. Magnetic switches 174, 175 are mounted on the support yoke 156b for sensing the retracted position of the transfer-arm head 158 on the respective delivery conveyor and carousel sides of the transfer mechanism. Converging light beam sensors 180, 181 also are provided for sensing the extended condition of the transfer-arm 155 on the respective carousel and delivery conveyor sides of the transfer mechanism.

To pivot the transfer-arm 155 from a position with the clamping head 158 on the delivery conveyor side of the transfer mechanism (FIG. 12) to a position where the clamping-head 158 is on the carousel station side of the transfer mechanism (FIG. 18), one of the pivot-bracket support shafts 171 carries a pinion 178 which can be selectively rotated by a rotary actuator 179 mounted on the support-bracket yoke 156b. The illustrated rotary actuator 179, which may be of a known air-oil tandem type, includes a pair of air cylinders 179a disposed on opposite sides of the pivot-bracket shaft 171, each cylinder 179a having an oppositely driven piston rack 179b engaging the pinion 178, as shown in FIG. 14, and FIGS. 21a–21e. By supplying air to the upper end of one cylinder 179a, the rack 179b of that cylinder is driven in a downward direction, forcing the rack of the adjacent cylinder upwardly, thereby rotating the drive pinion 178, the pivot-bracket 170, and the transfer-arm 155 carried therein. Actuating the opposite cylinder 179a of the rotary actuator 179 rotates the pinion 178 and transfer-arm 155 in the opposite direction.

The sequential operation of the loading station transfer mechanism 140 is illustrated in FIGS. 21a–21e. Actuation of the cylinder 172 extends the transfer arm to move the clamping-head 158 into position for receiving a pair of elements 20 in their upright position at the end of the delivery conveyor 31 (FIG. 21a); the transfer-arm head 158 engages or clamps the elements by the actuation of cylinders 165, 166 and the transfer arm and the head are retracted by the actuation of cylinder 172, thereby removing or withdrawing the elements from the delivery conveyor (FIG. 21b); the transfer arm is pivoted by the actuation of the rotary actuator 179 to locate the elements on the carousel side of the transfer mechanism 140 in inverted position (FIG. 21c); the transfer-arm 155 again is extended to move the clamping-head 158 and the elements 20 carried thereby into a carousel station 40 for engagement of said elements by the elevator head 60 thereof, as will be described later (FIG. 21d); and the transfer-arm head 158 then releases the elements and is retracted, leaving the elements in the carousel station (FIG. 21e).

Each carousel station elevator head 60, shown in FIGS. 12 and 16, is mounted on upstanding support shafts 185 in elevated position above the carousel table 50 and is adapted to receive elements from the transfer mechansim and hold the elements as the carousel station is successively indexed through the operating stations. The elevator head support shafts 185 extend through the carousel table 50 between elongated sections 105 of the mold 61 and are supported for relative sliding movement in bearings 186 fixed to the underside of the carousel table base plate 115. The lowermost ends of the support shafts 185 are secured by a tie plate 188 mounted on the end of a piston rod 189a of a double-acting cylinder 189 secured in depending fashion from the underside of the base plate 115.

The elevator head 60 of each carousel station in this instance is formed with a central leg 190 and a pair of outwardly spaced legs 190a (FIG. 16) on each side thereof which define a pair of element-receiving recesses 190b. An upstanding back plate 191 is mounted on the head 60 at the rear of each element-receiving recess for establishing a rear reference for elements 20 positioned therein. For selectively engaging elements positioned in the elevator head 60, a transversely movable clamping bar 192 is mounted on the inside of each of the outer legs 190a. The clamping bars 192 each are carried on the ends of rods 194a of single-acting cylinders 194 fixed to the outside of the respective legs 190a such that upon actuation of the cylinders 194 the clamping bars 192 are moved inwardly to an element clamping position (FIG. 20). Each of the clamping bars 192 are biased toward an outer or open position by a spring 195 which cooperates with a central clamp-bar shaft 196 extending outwardly through its supporting leg 190a. To permit selective actuation of the elevator head clamping cylinders 194, the clamping cylinders 194 are coupled to the air manifold 79 for the carousel station, which is connected by the line 80 to the respective solenoid, control valve SOL-3 for the carousel station.

Thus, when the clamping bars 192 of the carousel station elevator head 60 are in their open, or element-receiving position, the clamping head 158 of the transfer-arm 155 may be moved into the carousel station 60 to a position immediately above the elevator head 60, as shown in FIGS. 18 and 19, to position a pair of elements 20 in the elevator head 60 with their lower ends thereof extending below the elevator head. With the elements so positioned, the elevator head cylinders 194 may be actuated to cause the clamping bars 192 to engage the elements, at which time the transfer-arm head 158 can release the elements and be moved to a retracted position away from the carousel station, as indicated in FIG. 20.

As will become apparent, upon indexing of the carousel station 40 to the loading station 45A and prior to the transfer of elements 20 to carousel elevator head 60, the logic connector 65a of the transfer stations may be brought into engagement with the logic connector 65 of the carousel station for coupling the master controller 85 for the apparatus to the carousel station, and the electrical contact-clamps 120 for the transfer station 45A may be coupled to the terminal flanges 108 of the carousel station mold 61 for preheating the mold. Following loading of elements into the carousel station, the electrical contactor clamps 120 and logic connector 65a may be disengaged from the carousel station in the manner previously described, permitting the carousel station to be advanced to the alignment station 45B, where the electrical contact-clamps 120 and logic connector 65a of that station engage the carousel station.

The alignment station, shown in FIGS. 22–25, includes a lug-alignment mechanism 200 having a lug-aligning head 201 mounted on a carriage 202 for reciprocal movement to and from a carousel station 40. The lug-alignment head 201 has a frame 204 with a rear portion supported from the underside of the carriage 202 and two separate extensions 204a protruding forwardly of the carriage. The frame extensions 204a each have a pair of elongated lug-seating plates 204b upon which respective rows of lugs 22 of an element 20 are positionable. The carriage 202 in this instance has guide rods 205 on the underside thereof supported in linear bearing blocks 206 for relative translational movement. The bearing blocks 206 are mounted on a separate support bracket 208 extending outwardly of the apparatus frame plate 52.

For selectively moving the carriage 202 to and from a carousel station 60, a double-acting air cylinder 209 is carried by the support bracket 208 and has a rearwardly directed piston rod 209a secured to a depending bracket 210 fixed to the rear of the carriage 202. Retraction of the rod 209a through actuation of the cylinder 209 will move the carriage 202 from a retracted position, shown in FIG. 22, to an advanced position, shown in FIG. 23, with the lug-alignment head 201 disposed below the carousel station elevator head 60 and the elements 20 held therein. A limit switch 211 mounted on the carriage-support bracket 208 is actuated by forward and rearward carriage-locating stops 212, 214 for sensing the advanced and retracted position of the carriage 202.

In order to raise the lug-aligning head 201 from the position below the elements 20 at which it is located during advancement of the carriage 202 to an elevated position with the seating plates 204b thereof in relatively close proximity to the lugs 22 of elements 20 supported in the carousel elevator head 60, the aligning head 201 is mounted on guide posts 215 depending from the underside of the carriage for limited vertical movement with respect to the carriage. For raising the lug-aligning head 201 on the guide posts 215 an air cylinder 216 is mounted on the carriage 202 with its piston rod 216a extending downwardly through the carriage into engagement with the rear frame portion of the alignment head 201. Actuation of the air cylinder 216 will move the rod 216a in an upward direction raising the head 201 a distance established by adjustable stops 218 mounted in the carriage immediately above the head. A limit switch 219 actuated by a flange 220 secured to the rear of the head 201 senses the raised head position.

By carrying the lug-alignment head 201 in its lowered position in the foregoing manner when being moved by the carriage 202 into the carousel station it can be seen that there will be ample clearance for even significantly misaligned lugs 22 of elements 20 held in the carousel station. After positioning of the lug-alignment head 201 below the elements, the alignment-head 201 can be raised by actuation of the cylinder 216 to position the lug-seating plates 204b thereof in closer proximity to the element lugs 22.

With the lug-alignment head 201 in such raised position, the carousel station elevator head 60 may thereupon release the elements carried therein to allow them to drop onto and be supported on the lug-seating plates 204b, thereby establishing horiztonal alignment of the lugs. To maintain the elements in an upright position upon their release by the elevator head 60, pairs of forwardly extending guide rods 225 are mounted in a bracket 226 which in this case is secured to the upper end of the cylinder 216. Each pair of guide rods 225 is disposed closely adjacent opposite sides of one of the elements 20 and are formed with outwardly flared forward ends 225a which permit the rods to be guided into proper position about the elements during their movement with the alignment-head 201 into the carousel station. In order to establish firm engagement of each element 20 against the respective elevator head rear reference plate 191, a pair of air cylinders 228 are mounted on the carriage 202 and have plunger rods 228a which, upon actuation of the cylinders 228, are extended to force the elements against the rear plates 191.

With the elements in the carousel station supported on the raised seating plates 204b of the alignment-head 201 and properly referenced against the rear plate 191, the alignment-head 201 is adapted to clamp and precisely align the element lugs 22. To this end, the frame extensions 204a of the alignment head each carry two clamp assemblies 230, 231 for transverse movement with respect to the respective seating plates 204b. The first clamp assembly 230 includes a pair of shafts 230a which are slidably supported in the alignment-head frame 204a and have ends extending outwardly thereof coupled by an extension tie bar 230b. A pair of clamps 230c are fixed in spaced relation on the opposite ends of the shafts 230a adjacent the inner sides of the respective seating plates 204b. The second clamp assembly 231 is supported for relative sliding movement on the shafts 230a of the first clamp assembly 230 and includes a pair of spaced clamps 231c which are disposed on outer sides of the respective seating plates 204b and tied together by a shaft 231a extending through the outermost of the two seating plates 204b of the frame extension 204a.

For moving the alignment-clamp assemblies 230, 231 relative to each other to effect clamping and alignment of element lugs positioned on the seating plates 204b, a double-acting air cylinder 231b is mounted on the outermost clamp 231c of the second clamp assembly 231 and has a piston rod 231d extending outwardly of the frame extension 204b which is secured to the tie bar 230b of the first clamp assembly 230. When the cylinder 231b is actuated to move the rod 231d inwardly, as shown in FIGS. 26 and 27, the tie bar 230b, shafts 230a and clamps 230c of the assembly 230 are pulled inwardly, while the cylinder 231b and clamps 231c of the second assembly 231 are forced in an outer direction by the reaction forces, thereby causing the pairs of clamps 230c, 231c to be moved oppositely to their open positions which permits unaligned lugs of elements (FIGS. 26, 27) held in the carousel station to be placed onto and removed from the alignment-head seating plates 204b. Upon actuation of the cylinder 231b in the opposite direction, illustrated in FIGS. 26a and 27a, extension of the piston rod 231d forces the bar 230b, shafts 230a, and clamps 230c of the first assembly in an outer direction while the reactionary forces move the cylinder 231b, shaft 231a, and clamping plates 231c of the second assembly 231 inwardly, thereby clamping the element lugs 22 positioned on the seating plates 204b and forcing them into substantial longitudinal alignment. Following such alignment, the carousel station elevator head 60 will re-engage the elements, the lug-alignment head 201 will release the elements, the lug-alignment head 201 will be lowered, and the carriage 202 will retract the alignment-head 201 from the carousel station.

It will be appreciated that by aligning the lugs 22 of elements 20 in the foregoing manner the elements may be previously assembled, transferred along the delivery conveyor 31 to the carousel 35, and loaded into the carousel without concern for precise lug alignment. Following alignment of the lugs at the carousel alignment station 45B, it will be seen that the elements will thereafter be held in the elevator head 60 in such aligned condition throughout the casting operation.

Upon completion of the lug-alignment operation, the electrical contact-clamps 120 and the logic connector 65a at the alignment station may be disconnected from the carousel station to permit its indexing to the lead-pour station 45C. Prior to such indexing, the master controller 85 for the apparatus, to be described later, will determine whether the mold 61 carried at such station has been heated to high temperature set-point of the temperature controller 131, and if not, the carousel station will be retained at the alignment station until such mold preheat temperature is reached. Upon indexing of the carousel station 40 to the lead-pour station 45C, the heat control-clamps 120 and the logic connector 65a of that station are coupled to the carousel station.

The lead-pour station 45C, shown in FIGS. 28, 28a and 29, includes a molten-lead containing ladle 240 supported by a carriage 241 which in turn is supported for sliding movement to and from a carousel station 40 on guide rods 242. The guide rods 242 are mounted on a support bracket 244 extending outwardly of the frame plate 52. For moving the ladle 240 from a retracted position, shown in FIG. 28, to an advanced pouring position, shown in FIG. 28a, a double-acting air cylinder 245 is mounted between the ladle carriage 241 and an upstanding plate 244a of the outwardly extending support-bracket 244. Limit switches 246, 248 mounted on the support-bracket 244 sense the respective advanced and retracted positions of the ladle 240.

The illustrated ladle 240 has four pouring spouts 250 and is adapted to simultaneously dispense controlled quantities of molten lead through the spouts into respective elongated sections 105 of each mold 61 advanced to the lead-pour station. The ladle 240 and spouts 250 in this case each have electrical heating elements 251 for maintaining the molten lead at a temperature above its melting point. To control pouring of the molten lead into the molds, each spout 250 has an associated vertically disposed valve rod 252. For raising the valve rods 252 from a seated closed position, shown in FIG. 28, to a raised lead-pour condition, shown in FIG. 28a, the valve rods are suspended from the underside of one end of a pivot plate 254, the other end of which is secured to the rod 255a of an air cylinder 255. As is known in the art, a controlled quantity of lead can be dispensed through the respective spouts 250 by controlling the timing and stroke of the cylinder 255 and the depth of the molten lead in the ladle. Adjustable stops 258 in this case are mounted on a rod extension 255b for limiting opening movement of the valve rods from their respective seats. To ensure prompt and reliable valve closing following the lead pouring, a weight 256 is mounted on the plate 254 above the valve rods 252.

Following the lead-pour operation, the ladle 240 may be returned to its retracted position, shown in FIG. 28, the lead-pour station heat-clamps 120 and logic connectors 65a disconnected from the carousel station, and the carousel station indexed to the fluxing station 45D where the logic connectors and heat-clamps of that station are coupled to the carousel station.

The fluxing station 45D, shown in FIGS. 30–32, includes a carriage 260 having a pair of trays 261 mounted forwardly thereof for translational movement with the carriage to and from a carousel station and vertical movement relative to the carriage in a manner similar to the alignment head discussed previously. The trays 261 are mounted on a tray-support frame 262 suspended from the underside of the carriage and each contain a sponge 261a wetted with a suitable flux for enhancing bonding of molten lead to the element lugs. The carriage 260 has guide rods 264 on the underside thereof supported in linear bearing blocks 265 which in turn are mounted in a support bracket 266 extending from the machine plate 52. A rearwardly directed double-acting air cylinder 268 is supported between the support-bracket 266 and a carriage bracket 269 such that retraction of the rod 268a through actuation of the cylinder 268 will move the carriage 260 from a retracted position, shown in FIG. 30, to an advanced position, shown in FIG. 30a, with the flux trays 261 disposed below the carousel station elevator head 60 and the respective elements 20 supported to therein. The forward and retracted positions of the carriage 260 are sensed by a limit switch 270 actuated by forward and rearward carriage-locating stops 271, 272, respectively.

With the flux trays 261 positioned below the elements 20 in a carousel station, the trays may be raised through actuation of a cylinder 274 such that the flux wetted sponges 261a contained in the trays 261 contact the lugs 22 of the respective elements. The flux tray support frame 262, similar to the alignment-head frame of the alignment station, is suspended from the underside of the carriage 260 by depending guide posts 275 and secured to the end of the depending rod end of the cylinder 274. A switch 273 is provided for sensing the raised position of the trays.

Following fluxing of the element lugs 22, the flux trays 261 are returned to their lowered position and retracted from the carousel station 60, allowing the carousel station to then be indexed to the casting station 45E. The master controller 85 for the machine, again as will be described later, will effect disengagement of the logic connectors 120 and heat control clamps from the carousel station and indexing of the carousel station to the casting station 45E only if the mold 60 is above the determined high temperature set-point of the temperature controller 131. If the mold temperature is below such temperature, the carousel station 60 will be retained at the fluxing station 45D until the proper mold temperature is achieved.

In carrying out the invention, upon indexing of the carousel station to the casting station, the carousel station elevator head can be lowered to immerse the element lugs in molten lead contained in the mold, and immediately in response thereto, cooling means comprising forced-air mold cooling is actuated for cooling the mold and the molten lead. Other cooling means may, as is well known in the casting art, be utilized. In the illustrated apparatus, following coupling of the casting station logic connector 65a to the carousel station, the elevator head air cylinder 189 is actuated to extend the piston rod 189a thereof drawing downwardly the tie bar 188, the guide rods 185, the elevator head 60, and the elements 20 held therein such that the element lugs 22 are lowered into the mold 61 and immersed in molten lead which fuses to the lugs (FIGS. 33'36). For actuating the elevator cylinder 189, air lines 280 connect the cylinder to the double-actuating solenoid air-control valve SOL-2a, SOL-2b for the respective carousel station (FIG. 7) which in turn is controlled by the master controller of the apparatus, as will be described later. A proximity switch 283 mounted on the frame 52 is actuated by the elevator head 60 reaching its lowermost position, which generates a signal to the master controller indicating that the head is down.

Upon such actuation of the solenoid-control valve SOL-2a, SOL-2b, resulting pressurization of the air line to the elevator cylinder 189 closes a pressure switch 281 (FIG. 7) which in conjunction with carousel station circuitry, also to be described later, will actuate the cooling-air control-solenoid valve SOL-1 allowing air to be discharged through and out of the air-cooling tube assembly 62 of the carousel station. The cooling-tube assembly 62 in this case includes a plurality of elongated air-cooling tubes 62a disposed under and in closely spaced relation to the respective elongated mold sections 105, as shown in FIGS. 34–36. In the illustrated embodiment, the pair of cooling-tubes 62a for the two elongated mold sections 105 for each element are disposed slightly between the corresponding mold sections and have air outlet apertures 62b designed to direct air upwardly and outwardly at a slight angle with respect to each other so as to impinge the bottom surfaces of the two elongated mold sections 105. It will be appreciated that the thin-walled suspended mold sections 105 are susceptible to relatively quick and uniform forced-air cooling. To prevent build-up of spilled molten lead about the air-cooling tubes 62a, the mold mounting plate 114 has a tapered central opening 114a through which lead spatter may fall.

To couple the air cooling tubes 62a to the cooling-air control solenoid valve SOL-1 for the carousel station, the pairs of cooling-tubes 62a on each side of the mold are directed to a respective common manifold block 62c at their end adjacent the outer periphery of the carousel table 50 and each manifold block 62c in turn is coupled to an air supply line 62d directed under the carousel table to a T-fitting 62e which in turn is coupled to the control valve SOL-1.

Following lowering of the elevator head 60 at the casting station 45E and actuation of the cooling air, the casting station logic connector 65a may be disengaged from the carousel station so as to permit indexing of the carousel station to the successive cooling stations 45F, 45G, 45H, and 45I. Since the air flow through the cooling-tubes 62a is effected independent of operating station logic control and without the necessity for mold heating, neither logic connectors 65a nor electrical contact-clamps 120 in this instance are provided at the four illustrated cooling stations. The carousel station elevator head 60 will be indexed through the sucessive cooling stations in its lowered casting position, and cooling air will continue to be directed through the cooling-tube assembly 62 until the mold has been cooled to the predetermined low temperature set-point of the temperature controller 181, at which temperature the cast straps will have solidified and fused to the element lugs and the cooling-air solenoid control-valve SOL-1 for the station will be deactivated to halt the forced air cooling.

Upon the carousel station reaching the elevator head-up station 45J and being engaged by the logic connector 65a of that station, if the mold temperature has been cooled to the predetermined low temperature set-point so that the forced air has been terminated, the elevator head cylinder 189 will be actuated to cause the elevator head 60 to raise the elements out of the mold 61 with the straps cast thereon, as illustrated in FIGS. 38 and 39. If the mold temperature has not yet been lowered to the low temperature set-point upon reaching the elevator-up station 45J, the elevator head 60 will remain in the lowered casting position at that station with the cooling air actuated until the mold is cooled to the low set-point level. Upon such raising of the elevator head 60, a photo cell 285 mounted adjacent and slightly above the mold 61 will make light contact with its reflective plate 285a (FIGS. 7, 38, and 39) signalling that the elevator head 60 has been raised, permitting the logic connectors 65a to be disengaged from the carousel station and the carousel station to be indexed to the terminal-cell element unloading station 45K.

The terminal-cell element unloading station, depicted in FIG. 3, incudes an element transfer mechanism 140a similar to the loading station element transfer mechanism 140. Upon indexing of a terminal-cell element station 40T to the terminal-cell element unloading station 45K, and the coupling of operating station logic connector 65a to the carousel station, the transfer mechanism 140a will extend its transfer-arm head to engage the completed terminal-cell element 24T held in the carousel station elevator head in inverted position, the carousel station elevator head 60 will release the elements, and the transfer arm will be retracted, pivoted, and extended to position the completed terminal cell elements 24T in their upright position on the discharge conveyor 36.

Intermediate-cell element carousel stations 40I, on the other hand, will be indexed through the terminal-cell element unloading station 45K without element removal. Upon indexing of an intermediate-cell element carousel station 40I to the intermediate-cell element unloading station 45L, a transfer mechanism 140b, again similar to the terminal-cell element unloading transfer mechanism 140a, will remove the completed intermediate-cell elements 24I and transfer them in upright position onto the intermediate-cell element discharge conveyor 38. In the illustrated embodiment, electrical contact-clamps 120 are provided at the intermediate-cell element unloading station 45L for engaging the mold at that station to start the progressive mold preheating process for the next casting cycle. After leaving the intermediate-cell element unloading station 45L, the empty carousel station is then indexed to the loading station 45A for receiving elements for repeat of the cycle.

In accordance with yet another aspect of the invention, control means is provided for coordinating each of the operating and carousel stations to carry out the successive casting operations under optimum casting conditions and on a continuous basis. As diagrammatically illustrated in FIG. 40, the control means includes a master controller 85 which may comprise a conventional microprocessor-based programmable controller, such as a Gould Modicon 484 Programmable Controller, having a processor portion 290 and a memory portion 291 appropriately programmed to effect the sequential operations as hereinafter described. The master controller 85 in this case is adapted to communicate with each carousel station 40 through the slip ring assembly 86 on the carousel and through successive operating station logic connectors 65a. The master controller 85 also communicates with and directly controls functions at the operating stations 45. In each instance the master controller 85 communicates through conventional input and output modules which convert incoming signals from the various sensing devices of the apparatus to signal levels compatible with the controller and which convert output signals of the controller to signal levels compatible with the apparatus. In the illustrated embodiment, control means is further provided, as will become apparent, for permitting selected manual operation of certain of the operations.

Referring now to FIG. 41, there is shown an electrical circuit 295 for each carousel station 40 which enables automatic operation of the apparatus under the control of the master controller 85, or selective manual operation of a particular carousel station. The circuit 295 in this case is coupled to the master controller 85 by the carousel slip rings SR1-SR5 and by logic pins LP1-LP6 of a logic connector 65a at an operating station. Upon movement of a main ganged switch 296 to an "auto" position, switch contacts 298, 299 are closed while switch contacts 300, 301 are simultaneously opened. Upon closure of switch contact 298, current is conducted through line 302 between slip rings SR1 and SR2, energizing a station-on light "G" and providing a signal to the master controller 85 through logic pin LP1-I indicating that the station is "ON" and that the station is an intermediate-cell element station 40I. In the case of a terminal-cell element station 40T, a signal is conducted through logic pin LP1-T to the master controller.

When a carousel station is at the loading station 45A at the beginning of a cycle of operation, the master controller 85, communicating through logic pins LP3 and LP5, shall previously have energized solenoid SOL-2a to raise the carousel station elevator head 60 to its upper position and energized solenoid SOL-3 to permit return of the elevator head clamping bars 192 to their open, or element releasing and receiving position. After elements are positioned into the elevator head at the loading station 45A, the programmed operation of the master controller 85 communicating through logic pin LP5 will de-energize solenoid SOL-3 to clamp the elements in the elevator head. Programmed signals from the master controller 85 through logic pin LP5 similarly effect opening and closing of the elevator head clamps at the alignment station.

For controlling various of the operations in response to the temperature of the mold at each carousel station, the temperature controller 131 is connected between slip rings SR3 and SR2 and has a low set-point for controlling a normally opened, low-temperature control, contact TC-1a and a high set-point for controlling a normally closed, high-temperature control, contact TC-1b. By setting the temperature controller at appropriate high and low set-points, as previously described, contact TC-1a will close when the mold temperature is above the low set-point and contact TC-1b will open when the mold temperature is above the high set-point.

Early in the operating cycle, such as when the carousel is at the loading station 45A, the mold will previously have been cooled to a temperature below the low set-point, causing the high-temperature control contact TC-1a to be in a closed condition and the low-temperature control contact TC-1b to be open. Closure of contact TC-1b generates a signal to the master controller 85 through logic pin LP6 that heat is required, and in response thereto the master controller 85 will cause the energization of an operating station electrical contact-clamps 120 coupled to the carousel station to effect mold preheating. When the mold preheat temperature reaches the high set-point, which may occur at any of the successive operating stations where the mold is heated, contact TC-1b will open providing a signal to the master controller 85 through logic pin LP6 for de-energizing the electrical contact-clamps 120 of the operating station. Upon the carousel indexing to the casting station with the mold at the requisite preheated temperature, the master controller 85 will generate a signal through logic pin LP4 to energize solenoid SOL-2b for lowering the carousel station elevator head into casting position. Lowering of the elevator head will simultaneously close the normally open pressure switch 281 which, together with the already closed low-temperature contact switch TC-1a, will complete the circuit between slip rings SR1 and SR2, energizing solenoid SOL-1 to initiate forced air mold cooling, which in turn is sensed by the master controller 85 through logic pin LP2.

Since the cooling-air control solenoid SOL-1 is connected between carousel slip rings SR1 and SR2, the cooling air will remain on as the carousel station progresses through successive cooling station 45F–45I without logic connection with the master controller 85. Upon the mold being cooled to the low temperature set-point at any time during its passage through the cooling stations, or after its arrival at the elevator-up station 45J, contact TC-1a will open, thereby de-energizing solenoid SOL-1 and terminating the forced-air cooling.

When the carousel station is indexed to the elevator-up station 45J and is connected to the master controller through the logic connectors of such station, and the mold temperature is below the low temperature setpoint, the open condition of the low-temperature contact TC-1a will be sensed by the master controller 85 through logic pin LP2. In response thereto, the master controller 85 will generate a signal through logic pin LP3, thereby energizing solenoid SOL-2a to raise the elevator head and lift the elements from the mold. Upon indexing of the carousel station to the appropriate unloading station, the master controller 85, communicating through logic pin LP5, will again energize the elevator head-clamping solenoid SOL-3 for element unloading.

It can be seen, therefore, that during each of the foregoing carousel station operations logic pins LP3, LP4, and LP5 are inputs to the carousel station from the master controller 85 for controlling raising, lowering, and clamping operations of the elevator head, respectively, while logic pins LP1, LP2, and LP6 are inputs to the master controller 85.

The circuit 295 further permits stopping operation of the apparatus at the end of a cycle, or alternatively, on an instantaneous emergency basis. To this end, a switch 310 coupled between slip rings SR1 and SR5 may be manually closed to generate a signal to the master controller 85 through slip ring SR5 in response to which the master controller will cause the apparatus to come to an orderly completion of the existing cycle, while continuing to heat or cool as required by the temperature controller 131. Manual actuation of an emergency stop switch 311, on the other hand, will close contacts 313, 314 generating a signal to the master controller 85 through slip ring SR4, in response to which operations of the carousel and operating stations are immediately halted, major power to the apparatus is cut off, and the emergency stoplight "R" is energized.

To permit selected manual operation of certain of the carousel station functions, the switch 296 may be moved to its manual position, opening contacts 298, 299 and closing contacts 300, 301, Manual switches 315, 316, 317 and 318 may then be selectively actuated to energize the respective control-solenoids SOL-1, SOL-2a, SOL-2b and SOL-3 for actuating cooling air, and elevator head-up, elevator head-down and elevator head-clamping conditions.

In view of the foregoing, a programmed operating sequence of the entire apparatus 30, under control of the master controller, is as follows. In the following discussion, it will be understood that while various of the operating stations 45 may have individual power and air supplies, the limit switches and sensors at the operating stations referred to herein are adapted to permit communication to the master controller 85, and in response to such communications, the master controller is adapted to carry out the successive programmed functions in the manner and sequence described.

Starting at the loading station 45A with two elements in the normal upright position at the discharge end of the delivery conveyor 31 against extended stop-pins 151a and the transfer mechanism arm 155 retracted and the clamping-head 158 thereof in an open, or element receiving, condition on the conveyor side of the transfer mechanism 140, the transfer-arm 155 is extended by the actuation of cylinder 172 to move the clamping-head 158 into element-receiving position at the delivery conveyor, thereby opening magnetic switch 174 and converging beam switch 181 (FIG. 14); the stop-pins 151a are retracted by the actuation of cylinders 151; the transfer-arm clamping head 158 engages the two elements 20 on the delivery conveyor by the actuation of cylinders 165, 166; the transfer-arm 158 is retracted by the actuation of cylinder 172 removing the elements engaged therein from the delivery conveyor, thereby making magnetic switch 174 and converging beam switch 181 (FIG. 15); and photocells 152 sense the removal of the elements from the delivery conveyor 31 and the stop-pins 151a are returned to their extended position by the actuation of cylinders 151. The transfer-arm 155 is then rotated 180° vertically by the actuation of the rotary actuator 179 to position the clamping-head 158 on the carousel side of the transfer mechanism with elements 20 held therein in inverted position, opening magnetic switch 174 and closing magnetic switch 175.

Upon an open carousel station 40 being indexed to the transfer station 45a the master controller 85 effects a carousel "station engagement sequence" that includes engaging logic connectors 65a and electrical contactor-clamps 120 with the carousel station, and preheating the mold upon demand, as determined by the temperature controller 131, communicated to the master controller 85 through the logic connectors. With the elevator head-clamping bars 192 in their open, or element-receiving positions, the transfer-arm 155 is extended to move the elements in inverted position into the elevator head, thereby opening magnetic switch 175 converging beam switch 180 (FIG. 19); the elevator head-clamping bars 192 are moved to their element-clamping positions by the actuation of cylinders 194; the transfer-arm clamping head 158 releases the elements by the reverse actuation of cylinder 165 and de-activation of cylinders 166; and the transfer-arm 155 is then retracted, thereby leaving the elements held in the carousel statron elevator head 60, and making magnetic switch 175 and converging beam switch 180 (FIG. 20).

A signal is subsequently generated to the master controller 85 indicating that the loading station 45A is ready for indexing; the master controller waits until all carousel stations are ready for indexing; and at that time generates a "station disengagement sequence", including de-energizing power to the electrical contact-clamps 120, disengaging the heat contact clamps, disengaging the logic connector 65a, waiting for all operating station logic connectors to be down, and checking that all operating station heads are in retracted positions away from the carousel. Upon completion of the "station disengagement sequence", the carousel is rotated 30° by the indexer 51 advancing each carousel station to a succeeding operating station.

Upon indexing the carousel station to the alignment station 45R, the master controller 85 will again process a "station engagement sequence", as referred to above. The alignment-head 201 then is moved with its carriage 200 by the actuation of cylinder 209 from a retracted position (FIG. 22) to an extended position below the elevator head and the elements carried therein (FIG. 23) making limit switch 211; the alignment head is raised by the actuation of cylinder 216 to a position in which the seating plates 204b thereof are in close proximity with the lugs 22 of the elements supported by the elevator head 60, making limit switch 219; the elevator head-clamping bars 192 are opened by the de-activation of cylinders 166 allowing the elements to drop onto the alignment-head seating plates 204b; the element-positioning plunger rods 228a are extended by the actuation of cylinders 228 to locate the elements firmly against the elevator head rear reference plate 191; the alignment-head clamps 230c, 231c are moved into lug engagement and aligning positions by the actuation of cylinders 231b (FIGS. 26a, 27a); the elevator head-clamps 192 (FIG. 20) re-engage the elements by the actuation of cylinders 194; the alignment-head clamps release the element lugs 22 by the reverse actuation of cylinders 231b (FIG. 26a); the element-positioning plunger rods 228a are retracted by the reverse actuation of cylinder 216 (FIG. 25); and the alignment-head 201 is lowered by the reverse actuation of cylinder 216, thereby opening switch 219 and is then retracted from the carousel station, with its carriage 202, thereby closing limit switch 211, as shown in FIG. 23. Upon the mold being preheated to the high temperature set-point of the temperature-controller 131 and such temperature being sensed by the master controller 85 through the logic connection, an alignment station "ready-to-index" signal is generated, and following a "station disengagement sequence" as referred to above, the carousel is indexed to the next station.

Upon the carousel station being indexed to the lead-pour station 45C, the master controller again will process a "station engaging sequence", the carriage 241 will move the ladle 240 from a retracted position (FIG. 28) to a lead-pour position (FIG. 28a), thereby making switch 246; the ladle valve rods 252 are raised to their open positions by the actuation of cylinder 255 to permit molten lead to flow into the molds and in a timed sequence, returned to their closed positions by the de-activation of cylinder 255; the ladle carriage 241 is retracted by the actuation of cylinder 245, thereby making switch 248; a lead-pour station "ready-to-index" signal is generated; a "station disengagement sequence" is carried out; and the carousel is indexed to the succeeding station.

Upon the carousel station being indexed to the fluxing station 45D, a "station engagement sequence" is effected; the carriage 260 is advanced by the actuation of cylinder 268 from a retracted (FIG. 30) to an extended position, thereby making switch 270, with the flux trays 261 disposed below the carousel station elevator head 60 and the elements carried therein (FIGS. 30a, 31); the flux trays 261 are elevated relative to the carriage 260 by the actuation of cylinder 274 to apply flux to the element lugs, thereby making switch 273; the flux trays 261 are lowered relative to the carriage 260 by the reverse activation of cylinder 274, thereby opening switch 273; and the carriage 260 and flux trays 261 are retracted by the actuation of cylinder 268, thereby opening switch 270. Upon the mold being heated to the high temperature set-point of the temperature-controller 131 and this temperature being sensed by the master controller 85 from the logic connection with the operating station, a flux station "ready-to-index" signal is generated to the master controller, which, following a "station disengagement sequence," will cause the carousel station to be indexed to the next operating station.

Upon the carousel station being indexed to the casting station 45E, the master controller again will process a "station engagement sequence," in this case without heat contact-clamp engagement at the casting station, and the elevator head 60 will be lowered, by the actuation of cylinder 189, to immerse the element lugs into the molten lead contained in the mold, thereby closing pressure switch 281 and proximity switch 283 (FIG. 7). Upon closure of switch 281, the cooling-air control valve SOL-1 is opened to permit cooling air to be directed through the tubes 67a onto the molds, which continues upon demand as sensed by the temperature controller 131. A casting station "ready-to-index" signal is then generated, and following a "station disengagement sequence," the carousel station is indexed to the first cooling station 45F with the elevator head 60 thereof remaining in its lowered, or casting position.

The carousel station is successively indexed through each of the four cooling stations 45F, 45G, 45H and 45I independent of logic connection with the master controller 85 or electrical contact-clamp connections with the operating station. Upon the temperature of the mold being lowered to the low set-point of the temperature-controller 131, the cooling-air solenoid valve SOL-1 is de-energized to terminate further forced air mold cooling.

Upon the carousel station being indexed to the elevator head-up station 45J, a "station engagement sequence" is effected, again without heat-clamp engagement. If the mold has not been cooled to the low-temperature control set-point prior to reaching this station, cooling will continue until that temperature is reached. Upon the mold being sensed at the low-temperature set-point, the elevator head 60 is raised by the actuation of cylinder 189. Upon the elevator head-up position being verified by photoreflective sensors 258, an elevator head-up station "ready-to-index" signal is generated. Following a "station disengagement sequence," the carousel is indexed to the next station.

Upon a terminal-cell element carousel station 40T being indexed to a terminal-cell element unloading station 45K, the "station engagement sequence" again is effected without heat-clamp engagement. The terminal cell element transfer mechanism 140a at this station, as indicated previously, is identical to the loading station transfer mechanism and operates in reverse sequence in engaging completed terminal-cell elements in the carousel station elevator head 60, removing the elements in their inverted position from the elevator head, rotating the elements 180° vertically, and transferring them onto the delivery conveyor in their upright position. In the event an intermediate-cell element carousel station 40I is advanced to the terminal-cell element unloading station 45K, such indexing is sensed by the master controller through the logic connection and such carousel station 40I will be indexed through the terminal-cell element unloading station without element removal.

Upon an intermediate-cell element carousel station 40I being indexed to the intermediate-cell element unloading station 45L, a "station engagement sequence" again is carried out, including heat-clamp engagement for mold preheating. The completed intermediate-cell elements, as previously indicated, are similarly removed from the carousel station elevator head by the transfer mechanism 140b, inverted and deposited on the intermediate-cell element delivery conveyor 38. Terminal-cell element carousel stations 40T are automatically indexed through this operating station. In either case, an intermediate-cell element unloading station "ready-to-index" signal will then be generated, the "station disengagement sequence" effected, and the carousel station indexed to the loading station for repeat of the cycle.

From the foregoing, it can be seen that the apparatus of the present invention is adapted for efficient casting of lug straps onto lead acid battery cell elements. The apparatus insures optimum casting conditions, enables relatively precise control of mold temperatures on a continuous basis, and eliminates the necessity for critical timing in the casting operation following mold filling. The apparatus further permits easy handling of the battery cell elements, allows cell elements to be delivered to the carousel in their normal upright position without prior precise alignment of the lugs upon which straps are to be cast, and enables simultaneous processing of elements at a multiplicity of carousel stations for both intermediate and terminal battery cell elements.

We claim:

1. An apparatus for casting straps onto rows of lugs of battery cell elements comprising an indexable table having a plurality of stations at circumferentially spaced locations about the periphery of said table; said table stations each including an element holding head and a mold formed with a lug strap cavity; means mounting each said head on said table at an elevated position above the respective table station mold, said head for each table station having means for releasably engaging an element and being mounted on said table for movement between an element receiving position with the lugs of the element held therein disposed above the mold of said table station and a casting position with the lugs of an element held therein disposed in said mold; means for indexing said table to simultaneously and successively move said table stations to a plurality of operating stations located immediately adjacent the periphery of said table including an element loading station where an element is positioned into a table station head upon indexing of table station to said loading station, a molten-metal pouring station having means for dispensing a determined amount of molten metal into a table station mold upon indexing of the respective table station to said pouring station and while an element is held in the head, and an unloading station where elements with straps cast thereon are removed from said head; means for moving each said head and an element held therein to said casting position following dispensing of molten metal into said mold at said pouring station; and means for returning each said head to said element-receiving position to permit removal from said head of an element with straps cast thereon at said unloading station.

2. The apparatus of claim 1 in which said loading station includes a delivery conveyor and element transfer means for successively transferring elements from said delivery conveyor to a head upon indexing of a respective table station to said loading station, and said unloading station includes a discharge conveyor and transfer means for successively removing elements from a table-station head upon indexing of a respective table station to said unloading station and positioning said elements on said delivery conveyor.

3. The apparatus of claim 1 in which said loading station includes means adjacent said table for receiving an element with lugs thereof on an upper side and means for inverting said element for engagement by said table head with the element lugs on an underside, and said unloading station includes means for engaging and removing an element held in said table head with the lug straps cast on an underside and means for inverting the element to a position with the lug straps on an upper side.

4. The apparatus of claim 1 in which said pouring station dispensing means includes a molten-metal containing ladle mounted adjacent said table, means for moving said ladle from a retracted position away from said table to a table-station position upon indexing of a table station to said pouring station, and means for dispensing said molten metal into the mold of said table station from said ladle upon positioning of said ladle to said table-station position.

5. The apparatus of claim 1 including a lug-alignment station having lug-alignment means mounted adjacent said table, means for moving said lug-alignment means from a retracted position away from said table to a table-station position upon indexing of a table station to said alignment station, and said alignment means having lug-engagement means for forcing respective rows of lugs of an element held in a table station head into substantially straight alignment upon movement of said lug-alignment means to said table-station position.

6. The apparatus of claim 5 including means for moving said lug-alignment means to a predetermined position in spaced relation below a respective table station head upon indexing of said table station to said alignment station, and means responsive to said positioning of said lug-alignment means below such table station head for raising said lug-alignment means to a relatively elevated position for engaging lugs of an element held by said head.

7. The apparatus of claim 1 including a fluxing station having flux applicator means mounted adjacent said table, and means for moving said flux applicator means from a retracted position away from said table to a table-station position for applying flux to lugs of an element held in a table station head upon indexing of a respective table station to said fluxing station.

8. The apparatus of claim 1 including a delivery conveyor and element-transfer means mounted adjacent said table for successively transferring elements from said delivery conveyor to a head upon indexing of a respective said table station to said loading station, a lug-alignment station including means mounted adjacent said table for successively aligning more precisely the lugs of an element carried in a table-station head upon indexing of the table station to said lug-alignment station, a fluxing station having flux applicator means mounted adjacent said table for successively applying flux to lugs of an element carried in a table-station head upon indexing of the table station to said fluxing station, and said unloading station including a discharge conveyor and transfer means mounted adjacent said table for successively removing elements from a table-station head upon indexing of said table station to said unloading station and positioning said elements on said discharge conveyor.

9. The apparatus of claim 8 including a casting station, and means for moving each table station head to said casting position in response to indexing of said table station to said casting station.

10. The apparatus of claim 1 including a cooling station, and means for cooling a table station mold while said table station is indexed at said cooling station.

11. The apparatus of claim 10 in which said cooling means includes cooling-air direction means mounted in close proximity to each said mold, and means for supplying forced air through said cooling-air direction means.

12. The apparatus of claim 11 in which each said table-station mold comprises a plurality of elongated strap cavity sections disposed in spaced relation to said table, and said cooling-air direction means includes elongated cooling-air directing tubes mounted in parallel adjacent relation to said elongated mold sections.

13. The apparatus of claim: 10 including means for heating each said mold to a predetermined temperature in excess of the melting point of the metal to be cast prior to dispensing of said molten metal at said pouring station.

14. The apparatus of claim 13 in which each said table-station mold includes electrical terminal means, and selected of said operating stations have electrical contactor means for engaging said mold terminal means and conducting electrical current through a table station mold for heating said mold to said predetermined temperature upon indexing of said table station to said selected operating stations.

15. The apparatus of claim 1 in which said table is mounted for rotatable indexing.

16. The apparatus of claim 1 in which said table stations each are substantially similar and are equal in number to said operating stations.

17. The apparatus of claim 16 in which each said table-station head includes means for simultaneously receiving and holding a plurality of elements, and each said table-station mold has cavities for simultaneously receiving the lugs of said plurality of elements.

18. An apparatus for casting straps onto rows of lugs of battery cell elements comprising an indexable table having a plurality of stations at circumferentially spaced locations about the periphery of said table; said table stations each including an element holding head and a mold formed with lug strap cavities; means mounting each said head on said table at an elevated position above the respective table station mold, said head for each table station having means for releasably engaging an element and being mounted for movement between an element-receiving position with the lugs of the element held therein removed from the mold and a casting position with the lugs of an element held therein disposed in said mold; means for indexing said table to simultaneously and successively move said table stations to a plurality of operating stations located adjacent the periphery of said table including an element loading station, a molten-metal pouring station, and an element unloading station; said loading station including means mounted adjacent said table for successively delivering an element to each said table station for engagement by the respective table station head upon indexing of said table station to said loading station; said pouring station including means mounted adjacent said table for dispensing a determined amount of molten metal into the cavities of a respective mold upon indexing of said table station to said pouring station and while an element is carried by the head of said table station; means for moving each said head and an element held therein to said casting position following dispensing of molten metal into said mold at said pouring stations; means for returning each said head to said element-receiving position following casting of said lug straps; and said unloading station including means mounted adjacent said table for removing an element with straps cast thereon from a table station head upon indexing of said table station to said unloading station.

19. The apparatus of claim 18 in which each said head is adapted for holding an element in inverted position with the lugs on an underside thereof, and said head-moving means raises and lowers said head and an element held therein relative to said mold.

20. The apparatus of claim 19 in which said loading station includes a delivery conveyor for moving elements in their upright position with lugs on an upper side thereof and transfer means disposed between said delivery conveyor and said table for successively removing elements from said delivery conveyor and transferring said elements in inverted position with lugs on the underside to a table station for engagement by the respective table station head, and said unloading station includes a discharge conveyor and transfer means disposed between said discharge conveyor and table for successively removing elements with cast lug straps on the underside thereof and positioning said elements onto said discharge conveyor in an upright position with lug straps on an upper side thereof.

21. The apparatus of claim 20 in which said loading station transfer means includes a pivotably mounted extensible and retractable transfer arm having a head for releasably engaging elements; and sequentially operated means for pivoting said transfer arm to locate the head thereof adjacent said delivery conveyor, extending said transfer arm to locate the head thereof in position to engage an element on said delivery conveyor, engaging said transfer-arm head with an element on said delivery conveyor, retracting said transfer arm and head to remove an element engaged in said transfer-arm head from said delivery conveyor, pivoting said transfer arm to locate an element engaged in the head thereof in inverted position adjacent said table, extending said transfer arm to locate an element engaged in the head thereof in position for engagement by a table-station head, releasing said transfer arm head from engagement with an element held therein, and retracting said transfer arm and head to a position away from said table station.

22. The apparatus of claim 21 in which said unloading station transfer means includes a pivotably mounted extensible and retractable transfer arm having a head for releasably engaging elements; and sequentially operated means for pivoting said transfer arm to locate the head thereof adjacent a table station indexed to said unloading station, extending said transfer arm to locate the head thereof in position to engage an element held in said table-station head, engaging said transfer-arm head with an element carried in a table-station head, retracting said transfer arm and head to remove an element engaged in said transfer-arm head from said table-station head, pivoting said transfer arm to locate an element engaged in the head thereof in upright position adjacent said discharge conveyor, extending said transfer arm to position an element engaged in the head thereof on said discharge conveyor, releasing said transfer-arm head from engagement with the element held therein, and retracting said transfer arm and head to a position away from said discharge conveyor.

23. The apparatus of claim 18 including a lug-alignment station having a lug-alignment device mounted adjacent said table for locating the lugs of an element carried in a table station head in more precisely aligned rows upon indexing of said table station to said lug-alignment station and prior to said table head moving said element to said casting position.

24. The apparatus of claim 23 in which said lug-alignment device includes an alignment head, means for moving said alignment head from a retracted position away from said table to a table-station position below table head upon indexing of a table station to said alignment station, and said alignment head having clamping means for releasably engaging respective rows of lugs of an element held in said table head to position the lugs of each row into substantially straight alignment.

25. The apparatus of claim 24 in which said lug-alignment head includes horizontal seating means for establishing horizontal alignment of lugs of an element held in said table head, and said clamping means are mounted for transverse movement relative to said horizontal seating means for establishing longitudinal alignment of element lugs seated on said horizontal seating means.

26. The apparatus of claim 25 including means for releasing a table station head from engagement with an element held therein following movement of said alignment head to said table-station position for permitting said element to be supported by the lugs thereof on said horizontal seating means for establishing relatively precise horizontal alignment of the lugs of said element, means for moving said clamping means into engagement with said lugs seated on said horizontal means following said table-head release of said element for establishing relatively precise longitudinal alignment of said lugs, means for re-engaging said table head with an element supported on said horizontal seating means following said clamping means lug engagement, and means for releasing said clamping means lug engagement upon said table head element re-engagement.

27. The apparatus of claim 23 including a fluxing station having a flux applicator device mounted adjacent said table, means for moving said flux applicator device from a retracted position away from said table to an extended table-station position below a table head upon indexing of a respective table station to said fluxing station, and means for raising said flux applicator device relative to a table station head indexed to said fluxing station for applying flux to lugs of an element held in said table head.

28. The apparatus of claim 27 in which each said table-station mold comprises a plurality of elongated strap cavity sections, and means disposed between said elongated mold sections of each mold for supporting said mold sections in elevated position on said table while permitting temperature expansion and contraction of said mold sections relative to said support means.

29. The apparatus of claim 28 including a cooling station having means for cooling each said mold upon indexing of a respective table station to said cooling station.

30. The apparatus of claim 29 in which said cooling means includes cooling-air directing means comprising elongated cooling-air directing tubes mounted in parallel adjacent relation to said elongated mold sections.

31. The apparatus of claim 18 in which ssid pouring station dispensing means includes a molten metal containing ladle mounted adjacent said table, means for moving said ladle from a retracted position away from said table to a table-station position upon indexing of a table station to said pouring station, and means for dispensing said molten metal into said mold from said ladle upon positioning of said ladle at said table-station position.

32. The apparatus of claim 18 including means for conducting electrical current through said table-station molds for heating said mold to a predetermined temperature in excess of the melting point of metal to be dispensed therein at said pouring station.

33. The apparatus of claim 32 in which each said table-station mold includes electrical terminal means, and at least some of said operating stations have electrical contactor means for engaging said mold terminal means upon indexing of a respective table station to an operating station having said contactor means.

34. The apparatus of claim 33 in which each said mold has a pair of electrical terminals, and said operating station electrical contactor means each include a pair of electrical contact clamps for engaging said mold terminals.

35. The apparatus of claim 34 in which said operating station electrical contact clamps each are mounted adjacent said table, and said mold terminals extend outwardly of said table for positioning into said contact clamps upon indexing of a respective table station to an operating station having electrical contactor means.

36. An apparatus for casting straps onto rows of lugs of battery cell elements comprising a rotatable table having a plurality of stations about the periphery thereof; said table stations each including an element carrying head and a strap mold; means for mounting each said head in elevated position above the respective table station mold; said table-station heads each having means for releasably engaging an element; means for moving each said table-station head between a raised position with the lugs of an element carried therein removed from the mold of the respective table station to a lowered casting position with the lugs of an element carried therein disposed in the mold; and means for rotatably indexing said table to successively and simultaneously move said plurality of table stations to respective operating stations about said table; said operating stations including an element loading station where elements are successively positioned in said table heads upon indexing of the table stations to said loading station, a molten-metal pouring station having means for successively dispensing a determined amount of molten metal into said table-station molds upon indexing of the table stations to said pouring station and while an element is carried by the respective head, and an unloading station where elements with straps cast thereon are removed from table-station heads upon indexing of the table station to said unloading station.

37. The apparatus of claim 36 including master control means, and releasable connecting means for operatively coupling a table station to said master control means through selected of said operating stations upon indexing of the table station to said selected operating station whereby said master control means controls functions of said table-station head.

38. The apparatus of claim 37 in which said master control connecting means includes a logic connector for each table station, and said selected operating stations each have a logic connector for coupling to the table-station logic connector upon indexing of said table station to said selected operating station.

39. The apparatus of claim 36 including means for intermittently heating said table-station molds at said selected operating stations, means for continuously monitoring the temperature of the mold of each table station, and means responsive to the temperature of the mold of a table station indexed to one of said selected operating stations falling below a predetermined high temperature for actuating the heating means of the mold of said table station.

40. The apparatus of claim 39 including means for conducting electrical current through each said table-station mold for heating said mold while indexed at one of said selected operating stations.

41. The apparatus of claim 40 including a cooling station including means for cooling said mold while indexed at said cooling station.

42. The apparatus of claim 38 in which said cooling means includes cooling-air directing means mounted adjacent the mold of each table station, and means for actuating said cooling-air direction means for each table station in response to lowering of the table-station head to said casting position following dispensing of molten metal into the mold of said table station at said pouring station.

43. The apparatus of claim 42 including means responsive to said cooling-air directing means cooling the mold of a table station below a predetermined temperature for de-actuating the cooling means of said table station.

44. The apparatus of claim 36 including master control means, releasable connector means for operatively coupling each table station to said master control means through selected of said operating stations upon indexing of a table station to one of said selected operating station, and selected operating stations each having means for intermittently heating the mold of a table station indexed to one of said selected operating stations, means for monitoring the temperature of each table-station mold, and means responsive to the temperature of the mold of a table station indexed to one of said selected operating stations falling below a predetermined high temperature for generating a signal to said master control means through said releasable connecting means at said operating station for energizing said heating means of said operating station.

45. The apparatus of claim 36 in which the molds at selected ones of said table stations have cavities for molding one form of lug straps, and the molds at other of said table stations have cavities for molding a second form of lug straps.

46. The apparatus of claim 45 including a first unloading station having means for unloading from the heads of said some table-station elements with said one form of straps cast thereon, and a second unloading station having means for removing from the heads of said other table stations elements with said second form of straps cast thereon.

47. The apparatus of claim 46 in which said table stations are circumferentially spaced about the periphery of said table, and every third-table station has a mold with cavities for molding said one form of lug straps, and every two succeeding table stations have molds with cavities for molding said second form of straps.

48. An apparatus for casting straps onto rows of lugs of battery cell elements comprising a rotatable table having a plurality of stations about the periphery thereof; said table stations each including an element carrying head and a strap mold; means for mounting each said head in elevated position above the respective table station mold; said table-station heads each having means for releasably engaging an element and being mounted for movement from a raised position with the lugs of an element carried therein removed from said mold to a lowered casting position with the lugs of an element carried therein disposed in said mold; means for rotatably indexing said table to successively and simultaneously move said plurality of table stations to respective operating stations including an element-loading station, a lug-alignment station, a molten-metal pouring station, a fluxing station, a cooling station, and an element-unloading station; said loading station including means mounted adjacent said table for successively transferring an element for engagement by a table-station head upon indexing of a table-station to said loading station; said lug-alignment station including means mounted adjacent said table for successively aligning more precisely the lugs of an element carried in a table-station head upon indexing of a table station to said lug-alignment station; said pouring station including means mounted adjacent said table for dispensing a determined amount of molten metal into the mold of a table station upon indexing of the table station to said pouring station and while an element is carried by the respective head; said fluxing station having flux applicator means mounted adjacent said table for successively applying flux to lugs of an element carried in a table-station head upon indexing of a table station to said fluxing station; means for successively moving said table-station heads into said casting position following dispensing of molten metal into the mold of said table station and fluxing of lugs of an element carried at said table station; means for directing forced-cooling air on said molds at said cooling station to solidify molten metal in said mold; means for successively moving said table-station heads to said raised position following mold cooling at said cooling station; and said unloading station including means mounted adjacent said table for removing an element with straps cast thereon from a table-station head upon indexing of a table station to said unloading station.

49. The apparatus of claim 48 including means for intermittently heating said table-station molds at selected of said operating stations, means for continuously monitoring the temperature of the mold of each table station, and means responsive to the temperature of the mold of a table station indexed to one of said selected operating stations falling below a predetermined high temperature for actuating said mold heating means at said operating station.

50. The apparatus of claim 49 in which said cooling-air directing means is mounted adjacent the mold of each table station, means for actuating said cooling-air directing means for each table station in response to lowering of the element carrying head of such station to said casting position following dispensing of molten lead at said pouring station, and means responsive to said cooling-air directing means cooling said mold to a predetermined low temperature for deactuating said cooling-air directing means of said table station.

51. The apparatus of claim 49 in which said mold comprises an electrically heatable mold having a one-piece body and parallel spaced elongated sections, said elongated sections each being formed with a cavity for receiving a row of lugs of a battery cell element and molten lead for forming a strap interconnecting the lugs of said row, and said body having electrical terminal means which upon coupling to an electrical source permits current flow through said mold and relatively uniform resistance heating of said elongated sections.

52. A method of casting straps onto lugs of battery cell elements comprising carrying an element holding head above a strap mold at each of a plurality of stations on an indexable table; indexing said table to simultaneously and successively move said table stations to a plurality of operating stations including a loading station, a molten-metal pouring station, and an unloading station; positioning an element into each said head upon indexing of the respective table station to said loading station; dispensing molten metal into each said mold upon indexing of the respective table station to said pouring station and while an element is held in said head; lowering each said table-section head and an element held therein to immerse the lugs of the element in molten metal dispersed in the mold; cooling said mold to a temperature below the melting point of the metal dispensed therein; raising each said table head and an element held therein to remove the element lugs from said mold with straps cast thereon following said cooling; and removing the element with straps cast thereon from each said table head upon indexing of the respective table station to said unloading station.

53. The method of claim 52 including heating each said mold to a predetermined temperature above the melting point of the metal to be cast prior to indexing of the respective table station to said pouring station.

54. The method of claim 53 including heating each said mold by conducting electrical current through said mold.

55. The method of claim 54 including cooling each said mold by directing forced air upon said mold.

56. The method of claim 55 including heating said mold by coupling said mold to an electrical source at an operating station upon indexing of said table station to said operating station.

57. The method of claim 56 including successively coupling each said table-station mold to electrical sources at a plurality of operating stations for heating said mold to said predetermined temperature and maintaining said temperature until said element lug immersion.

58. The method of claim 52 including continuously monitoring the temperature of each said mold, and intermittently conducting said electrical element current through said mold as required to maintain said predetermined mold temperature prior to said element lug immersion.

59. The method of claim 52 including indexing each said table station to a lug-alignment station, and aligning the lugs of an element held in the respective table station head into relatively precisely arranged rows while indexed at said alignment station.

60. The method of claim 59 including indexing each said table station to a fluxing station, and applying flux to lugs of an element held in the respective table station head while indexed at said fluxing station.

61. The method of claim 52 including continuously monitoring the temperature of each said mold, heating each said mold to a predetermined temperature above the melting point of the metal to be cast therein prior to indexing of the respective table station to said pouring station, and cooling each said mold to a predetermined temperature below said melting point prior to moving the head to remove the lugs of an element held therein from the respective mold.

62. The method of claim 56 including rotatably indexing said table.

63. The method of claim 62 including carrying at some of said table stations a mold with strap cavities for forming one form of lug strap and carrying at other of said table stations a mold with strap cavities for forming a second form of lug straps.

* * * * *

UNITED STATES PATENT AND TRADEMARK OFFICE
CERTIFICATE OF CORRECTION

PATENT NO. : 4,534,401

DATED : August 13, 1985

INVENTOR(S) : Schaumburg et al.

It is certified that error appears in the above-identified patent and that said Letters Patent is hereby corrected as shown below:

Claim 8, line 5, delete "said"

Claim 31, line 1, change "ssid" to -- said --

Claim 42, line 1, change "38" to -- 41 --

Claim 62, line 1, change "56" to -- 52 --

Signed and Sealed this

Twenty-eighth Day of June, 1988

Attest:

DONALD J. QUIGG

*Attesting Officer*  *Commissioner of Patents and Trademarks*